(12) United States Patent
Sugaya

(10) Patent No.: US 6,304,336 B1
(45) Date of Patent: Oct. 16, 2001

(54) OUTPUT CONTROL DEVICE AND IMAGE PROCESSING APPARATUS AND METHOD AND STORAGE MEDIUM

(75) Inventor: Akio Sugaya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/030,375

(22) Filed: Feb. 25, 1998

(30) Foreign Application Priority Data

Feb. 28, 1997 (JP) .................................................... 9-046630
Jan. 21, 1998 (JP) .................................................. 10-009771

(51) Int. Cl.⁷ ............................. B41B 15/00; B41J 15/00; G06F 15/00; H04N 1/21; H04N 1/23

(52) U.S. Cl. ..................... 358/1.16; 358/1.11; 358/1.12; 358/1.17; 358/1.19; 358/296

(58) Field of Search ................................. 358/1.16, 1.17, 358/1.11, 1.12, 1.9, 296, 1.19

(56) References Cited

U.S. PATENT DOCUMENTS 5,587,800 * 12/1996 Miyazaki ............................... 358/296

* cited by examiner

Primary Examiner—Edward Coles
Assistant Examiner—Twyler Lamb
(74) Attorney, Agent, or Firm—Fitzpatrick, Cella, Harper & Scinto

(57) ABSTRACT

System according to the present invention is adapted so that form data is registered according to form caching instruction data. Thus, the form data, which is a user resource, can be reused without being changed. Consequently, user's convenience can be enhanced, and form overlay processing can be achieved at a high speed. To realize such a system, in accordance with the present invention, when receiving form cache generation instruction data outputted from a host computer, the received form cache generation instruction data is stored in a nonvolatile memory. Further, for example, when a power supply is turned on, if form cache generation instruction data is present, form data is read from a corresponding flash memory in accordance with the instruction data. Then, form image data is formed, and the formed form image data is registered in a cache memory.

44 Claims, 17 Drawing Sheets

FIG. 15A
GENERATION INSTRUCTION DATA 1

```
JOB INITIATION INSTRUCTION
PROCESSING-RESOLUTION DESIGNATING INSTRUCTION=600DPI
PROCESSING-TONE-LEVEL DESIGNATING INSTRUCTION=1BIT
PAPER CARRYING DIRECTION SETTING INSTRUCTION=LATERAL FEED
BINDING WIDTH SETTING INSTRUCTION=5mm
BINDING DIRECTION SETTING INSTRUCTION=LEFT-SIDE BINDING
PDL CONVERSION INSTRUCTION=LIPS
PDL DATA INITIATION INSTRUCTION
SCALE DESIGNATION INSTRUCTION=100%
PAPER SIZE DESIGNATION INSTRUCTION=A4
DELETION LEVEL DESIGNATION INSTRUCTION=LEVEL 0
FORM RASTER GENERATION INSTRUCTION=FORM 1
PDL DATA TERMINATION INSTRUCTION
JOB TERMINATION INSTRUCTION
```

FIG. 15B
GENERATION INSTRUCTION DATA 2    1102

```
JOB INITIATION INSTRUCTION
PROCESSING-RESOLUTION DESIGNATING INSTRUCTION=300DPI
PROCESSING-TONE-LEVEL DESIGNATING INSTRUCTION=1BIT
PAPER CARRYING DIRECTION SETTING INSTRUCTION=LATERAL FEED
BINDING WIDTH SETTING INSTRUCTION=5mm
BINDING DIRECTION SETTING INSTRUCTION=LEFT-SIDE BINDING
PDL CONVERSION INSTRUCTION=LIPS
PDL DATA INITIATION INSTRUCTION
SCALE DESIGNATION INSTRUCTION=100%
PAPER SIZE DESIGNATION INSTRUCTION=A4
DELETION LEVEL DESIGNATION INSTRUCTION=LEVEL 1
FORM RASTER GENERATION INSTRUCTION=FORM 1
PDL DATA TERMINATION INSTRUCTION
JOB TERMINATION INSTRUCTION
```

FIG.17
PRINT DATA

```
JOB INITIATION INSTRUCTION
PROCESSING-RESOLUTION DESIGNATING INSTRUCTION=600DPI
PROCESSING-TONE-LEVEL DESIGNATING INSTRUCTION=1BIT
PAPER CARRYING DIRECTION SETTING INSTRUCTION=LATERAL FEED
BINDING WIDTH SETTING INSTRUCTION=5mm
BINDING DIRECTION SETTING INSTRUCTION=LEFT-SIDE BINDING
PDL CONVERSION INSTRUCTION=LIPS
PDL DATA INITIATION INSTRUCTION
SCALE DESIGNATION INSTRUCTION=100%
PAPER SIZE DESIGNATION INSTRUCTION=A4
FORM OVERLAY IMPLEMENTING INSTRUCTION=FORM 1

(VARIOUS KINDS OF POST-ENTERING DATA)

PDL DATA TERMINATION INSTRUCTION
JOB TERMINATION INSTRUCTION
```

OUTPUT CONTROL DEVICE AND IMAGE PROCESSING APPARATUS AND METHOD AND STORAGE MEDIUM

BACKGROUND OF THE INVENTION

1. Field of the Invention

The present invention generally relates to an output control device, to an image processing apparatus and method and to a storage medium. More particularly, the present invention relates to an output control device, to an apparatus and method for image processing, which are adapted to output image data that is generated by performing form (or forms) overlay processing, and to a storage medium.

2. Description of the Related Art

Page printers are operative to store an output image of one page in a bit map memory thereof and to further print the stored output image. There are two kinds of printing methods to be used in this case: a full paint method (namely, a full page printing method) which requires a full page bitmap (or bit map); and a banding method (namely, a band printing method) for forming an output image of one page by using a band memory which has a storage capacity of a fraction of one page.

In the case of the full paint method, a bitmap memory of one page is needed. Data to be printed is transferred to a printing mechanism portion after an image is generated on the bitmap memory. In the case of this method, when a resolution and a (printing) paper size are, for example, 600 dpi (dots per inch) and A3(-size), respectively, a memory of about 8 MB (megabytes) is needed as a bitmap memory. However, even in the cases that a large quantity of data should be printed and that data requiring long image generation time should be printed, output images, each of which is of one page, can be surely generated. Printed outputs corresponding to input data, therefore, can be ensured.

On the other hand, the banding method is to form an image correspondingly to each band by using the memory having a storage capacity of a fraction of one page. In this case, it is necessary that data of one page to be printed should be preliminarily stored in the device as an intermediate code and that the generation and transfer of an output image should be controlled on the basis of a synchronization signal, which is sent from a printing mechanism portion, by utilizing a bitmap memory of a fraction of one page as a ring buffer. In the case of this method, the device can operate by using a memory which has a lower storage capacity in comparison with the memory capacity of the memory used in the case of the full paint method. Moreover, in the case of the banding method, the device can simultaneously perform both of the generation of an output image and the transfer of the output image to the printing mechanism portion. Thus, the device can perform such processing at a high speed.

In the case that data are printed by performing each of the aforementioned two print control methods, when printing document data representing a document, such as a form, each page of which is represented by same data, the form data is preliminarily stored in a printer. Thereafter, numeric character data (hereunder sometimes referred to as post-entering data (namely, ordinary (variable) data)) to be (post-) entered up in blanks in the form are transferred thereto. Then, the printing of output image data is performed by utilizing the form overlay function of synthesizing the output image data from the stored form data and the ordinary data.

In the case of a conventional form overlay system, form data transferred from a host computer, is stored in the form of PDL (namely, Page Description Language) in a storage area of a printer. Then, post-entering data is inputted thereto. Upon completion of analysis of this data, the form data preliminarily stored in the form of PDL is read and an intermediate code is generated by detecting an event (for instance, a form feed instruction) that indicates the completion of the analysis. Subsequently, output image data is generated by being synthesized from the form data and the post-entering data on a bitmap memory (incidentally, this method is called an event-driven macro-method).

This method has drawbacks in that an intermediate code should be generated by analyzing the form data correspondingly to each page of the document and that processing time increases.

Further, although the form data corresponding to each page of the document is the same data, an intermediate code is generated correspondingly to each page of the document as a part of the post-entering data. Thus, the pages cannot have an intermediate code in common. Consequently, this method has another drawback in that an intermediate code area increases.

Therefore, a conventional system having the form overlay function according to another method (hereunder sometimes referred to as an intermediate code method) may be adapted so that intermediate code data is stored in a storage area in a printer after the intermediate code data is generated from form data (namely, PDL data) sent from a host computer and thereafter, output image data is generated by reading both of the intermediate code, which is generated from post-entering data, and the form data, which is preliminarily stored in the intermediate code form, and by being then synthesized from the form data and the post-entering data on a bitmap memory.

Conventional intermediate code method, however, has a drawback in that the necessary size (or storage capacity) of a storage area, in which form data is stored in the intermediate code form, of a registration memory increases in comparison with the case where the form data is stored therein in PDL form.

Moreover, the conventional intermediate code method further has drawbacks in that the necessary storage capacity of the storage (or registration) area of the registration memory for registration of form data therein is not found (or determined) until the analysis of the form data is performed in the printer and an intermediate code is generated therein, that thus, for example, the storage capacity of the registration area cannot be managed by the host computer, and that consequently, an overflow error occurs in the registration memory, and the form data cannot be registered therein normally.

Furthermore, in the case of the conventional intermediate code method, input image data is processed (for instance, scalable font data is stored after converted into a bitmap which has a predetermined size) so as to facilitate the generation of a rasterized image. Thus, the conventional intermediate code method has another drawback in that the scaling of the registered form data results in deterioration in picture quality and also results in reduction in processing speed.

Further, the printing of data on A4-size sheet can be realized in a printer, which can print data on A3-size sheet, by feeding A4-size sheet in longitudinal and lateral directions. However, in the case of the conventional intermediate code method, the rotation of an image is performed so as to facilitate the generation of a corresponding rasterized image. Thus, both of form data for feeding A-4 size sheet in a longitudinal direction and form data for feeding A4-size sheet in a lateral direction should be stored in the registration memory. Consequently, the conventional intermediate code method further has another drawback in that the necessary storage capacity of the registration memory increases.

Additionally, in the case of the conventional intermediate code method, when using a printer of the variable output resolution type that can change an output resolution, an input image is processed so as to facilitate the generation of a corresponding rasterized image. Thus, form data of the number corresponding to the output resolution should be stored in the registration memory. Consequently, the conventional intermediate code method has a drawback in that the necessary storage capacity of the registration memory further increases.

As described herein-above, in the case of the conventional intermediate code method, the system should have all of intermediate codes respectively corresponding to changes in generation conditions for performing the printing of the post-entering data. Thus, this conventional method has the drawback in that the necessary storage capacity of the registration memory increases.

In this case, the form overlay system is adapted so that PDL codes for the form are abandoned or nullified in a stage in which an intermediate code is generated from each of commands respectively corresponding to PDL codes. Thus, there is the necessity for generating post-entering data correspondingly to the generation conditions at the time of performing the printing thereof by transferring PDL code for the form. Consequently, the conventional intermediate code method and system have the drawback in that the processing speed decreases.

The present invention is accomplished to eliminate such drawbacks of the conventional method and system.

SUMMARY OF THE INVENTION

Accordingly, an object of the present invention is to provide an output control device, an image processing apparatus and method and a storage medium, by which form data is registered according to form caching instruction data, so that the form data, which is a user resource, can be reused without being changed, that thus user's convenience can be enhanced and that form overlay processing can be achieved at a high speed.

To achieve the foregoing object, in accordance with the present invention, for example, there is provided an output control device which comprises the following composing elements:

storage means for storing inputted form data and form generation instruction data;

cache means for generating form image data with predetermined timing, namely, at a predetermined time according to form data designated by the aforesaid form generation instruction data and for caching the generated form image data in a cache memory; and generation means for generating image data, which should be outputted, by using cached form image data when the aforesaid form image data corresponding to form data designated by inputted data is cached, and for generating image data, which should be outputted, by generating form image data according to form data designated by inputted data, which is stored in the aforesaid storage means, when form image data corresponding to the aforesaid form data designated by the aforesaid inputted data is not cached.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIGS. 15A and 15B are diagrams showing an example of the form cache generation instruction data used in the fourth embodiment of the present invention;

FIG. 17 is a diagram showing an example of a form overlay implementing print command.

DETAILED DESCRIPTION OF THE PREFERRED EMBODIMENTS

Hereinafter, the preferred embodiments of the present invention will be described in detail by referring to the accompanying drawings. Incidentally, in the following description, examples of the application of the present invention to a laser beam printer will be described as the embodiments of the present invention. However, needless to say, the present invention may be applied to laser beam printers of the other types. Additionally, the printers employed as the embodiments of the present invention is adapted to change the recording resolution thereof. Incidentally, the techniques for changing the resolution have been publicly known. Thus, the detailed description of such techniques is omitted herein.

<First Embodiment>

Figure 1:
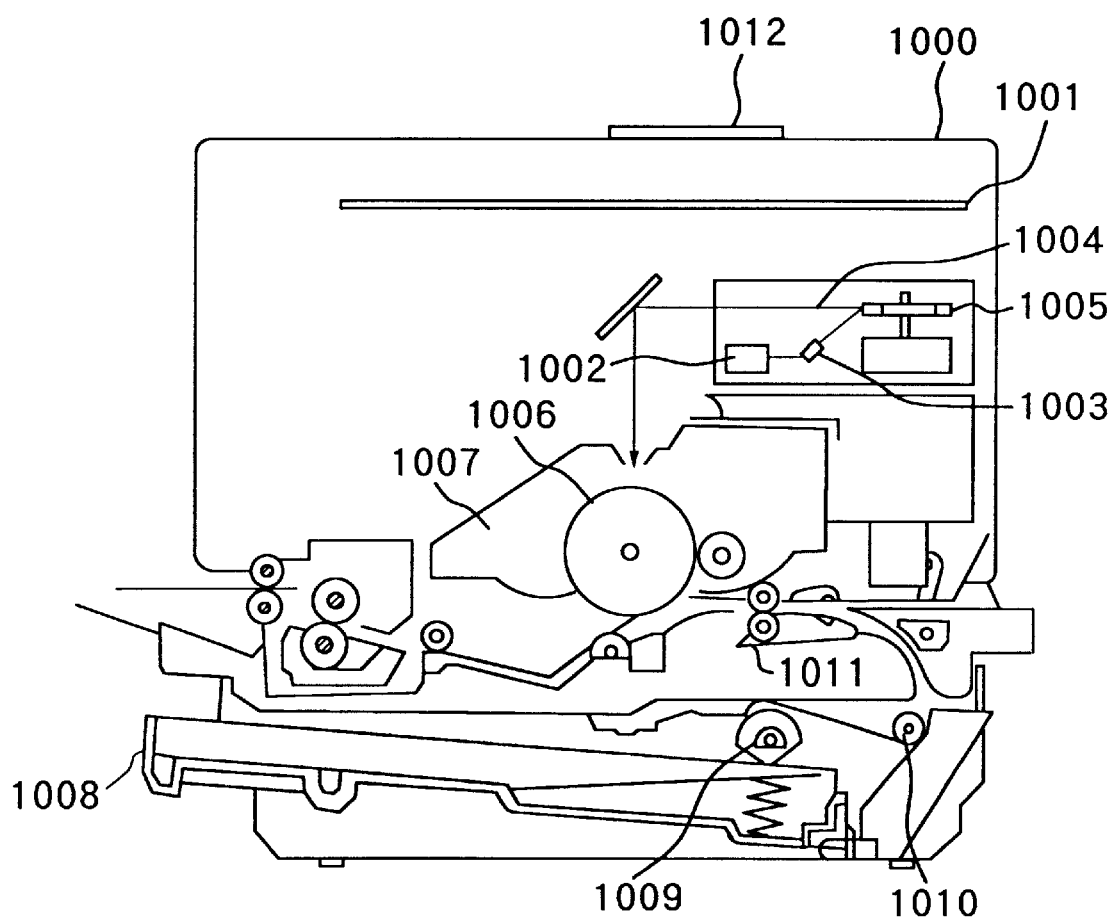
FIG. 1 is a sectional diagram showing the structure of a printer in an embodiment of the present invention.

FIG. 1 is a sectional diagram showing the structure of a laser beam printer (hereunder sometimes abbreviated as LBP) in an embodiment of the present invention.

In this figure, reference numeral 1000 denotes the main unit (or body) of LBP, which receives and stores print information (such as character codes), form data and macro instructions and further generates character patterns and form patterns according to such information and moreover, forms images on recording paper which serves as a recording medium. Reference numeral 1012 designates a console panel on which switches and LCD display device for operations are provided; and 1001 a printer control unit for controlling the entire main unit of LBP 1000 and for analyzing character information and so on supplied from a host computer. This printer control unit 1001 is operative to convert mainly the character information into a character pattern video signal and to output such a signal to a laser driver 1002. The laser driver 1002 is a circuit for driving a semiconductor laser 1003. The semiconductor laser 1003 is operative to change the state of an operation of generating laser light between an on staten and an off state thereof in response to an inputted video signal. Laser light 1004 is swung laterally as a result of being reflected on side surfaces of a constant-speed rotating polygon mirror 1005, so that the surface of an electrostatic drum 1006 is scanned with the laser light and is exposed thereto. Thus, an electrostatic latent image of a character pattern is formed on the electrostatic drum 1006. Further, this latent image is transferred onto recording paper after developed in a development unit 1007 provided around the electrostatic drum 1006. Cut sheet is used as this printing paper and is contained in a paper cassette 1008 that is fitted into LBP 1000. Moreover, cut sheets of recording paper are taken into the unit by means of a paper feeding roller 1009 and conveying rollers 1010 and 1011 and is thus supplied onto the electrostatic drum 1006.

Furthermore, the main unit of LBP 1000 is provided with card slots (not shown). Optional font card, which is used to add optional fonts to internally stored fonts, control cards (or emulation cards) using different language systems (PDLs) and memory cards in which form data and font data can be written and held, can be connected to the unit through the card slots.

Figure 2:
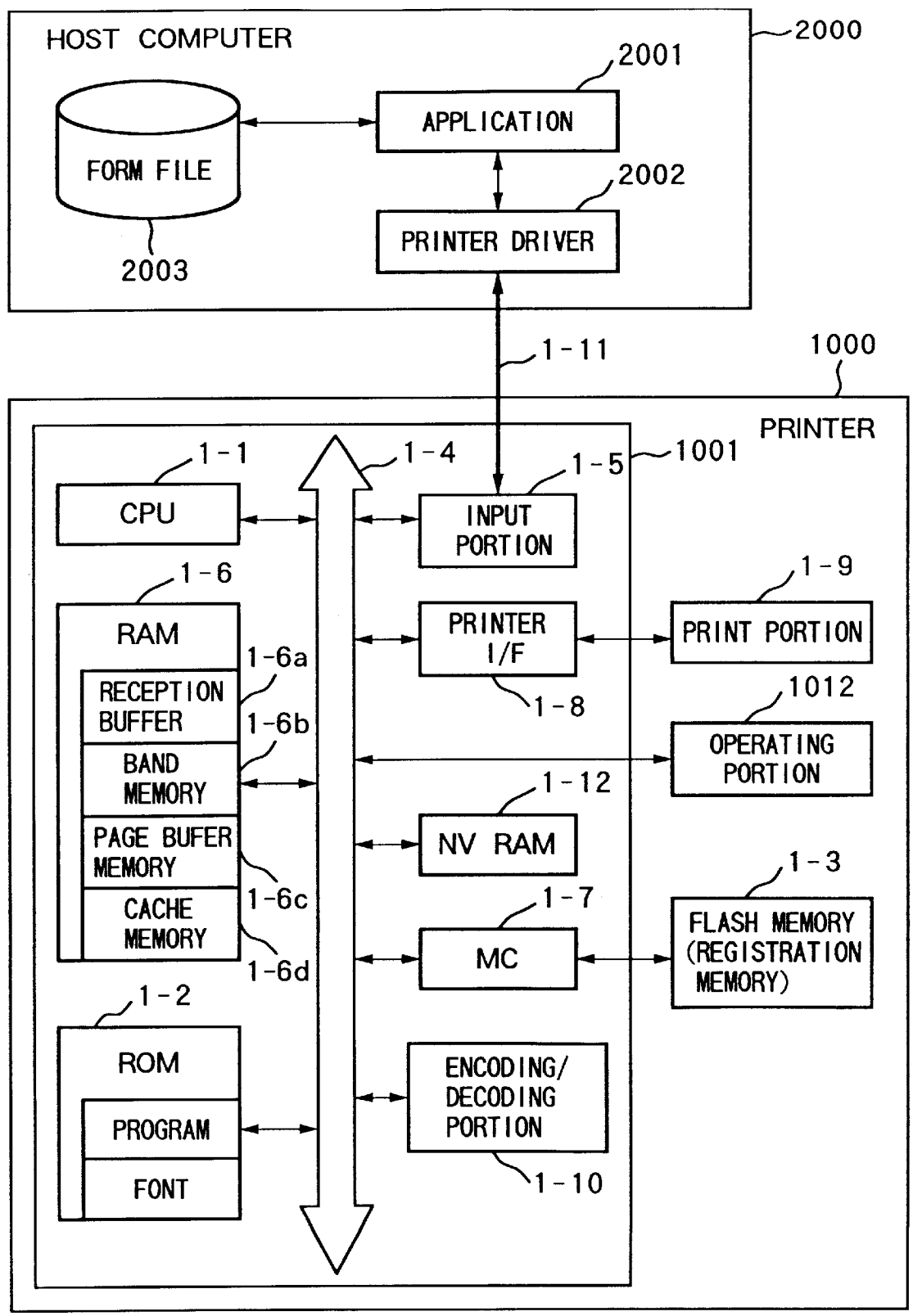
FIG. 2 is a block diagram showing the configuration of the printer in the embodiment of the present invention.

FIG. 2 is a block diagram mainly showing a printer control unit 1001 in this embodiment of the present invention. Further, needless to say, the present invention can be applied to a stand-alone apparatus, to a system consisting of plural devices and to a system, in which processing is performed through a network such as a local area network (LAN), as long as the functions thereof according to the present invention can be performed.

In this figure, reference numeral 2000 designates a host computer that is connected to the printer control unit 1001 through a predetermined interface 1-11 (for instance, a bidirectional interface) and performs communication control processing on the printer 1000.

In a block representing the printer control unit 1001, reference characters 1-1 denote a printer CPU (namely, central processing unit) which is operative to collectively control various kinds of devices connected with a system bus 1-4 according to a control program stored in a read-only memory ROM 1-2, and is operative to output an image signal representing output image information to a print portion (namely, a printer engine) 1-9 through the print portion interface 1-8. Incidentally, a control program for CPU 1-1 and an image generation program for generating a bitmap image to be transferred to the print portion 1-9 (which are shown in FIGS. 3 to 7) are stored in ROM 1-2. Moreover, font data (namely, outline font data or dot font data) used for generating the aforementioned output image is stored in ROM 1-2.

CPU 1-1 is configured in such a manner as to be able to communicate with the host computer through an input portion 1-5. Reference characters 1-6 designate a random access memory RAM serving as a main memory and a work area for CPU 1-1. Further, the memory capacity can be increased by using an optional RAM to be connected to an expansion or extension port (not shown). Incidentally, in RAM 1-6, storage areas are allocated to a reception buffer 1-6a for storing received data, a page buffer 1-6c for storing data, which should be stored, as intermediate codes, a band memory 1-6b into which bitmap image data is loaded, and a cache memory 1-6d for storing a bitmapped form image. Moreover, a flash memory 1-3, which is an external memory, is used as a registration memory for storing form data transferred from a form file stored in the host computer 2000.

One of the functions of an encoding/decoding portion 1-10 is to encode a bitmap image represented by form data which is loaded into the band memory 1-6b provided in RAM 1-6. Further, form image information coded under the control of an image generation program is stored in the cache memory 1-6d that is provided in RAM 1-6.

Access to the aforementioned flash memory 1-3 is controlled by a memory controller (MC) 1-7. Flash memory 1-3 is optionally connected to MC 1-7 and is operative to store form data, font data and emulation programs or the like. Moreover, reference numeral 1012 designates the aforementioned console panel on which switches and LCD display device for operations are provided.

Furthermore, the number of flash memories is not limited to one. One more flash memories may be provided in the printer in such a way as to be able to be connected with an optional font cards for adding optional fonts to internally stored fonts, and with a plurality of external memories which store programs for interpreting printer control languages written in different language systems (or PDLs). Moreover, memory cards (for instance, hard disks) other than a flash memory may be provided in the printer. Especially, the embodiment has NVRAM (namely, nonvolatile RAM) 1-12 which is a nonvolatile memory. This NVRAM 1-12 is always supplied with backup power from a battery (not shown) and is operative to store environmental conditions set by an operator through the console panel 1012 or to hold a command for setting environmental conditions, which is sent from the host computer. Thus, the stored data representing the set environmental conditions are not lost even when interrupting power supplied from the power supply. Therefore, when turning on the power supply, the state of the printer can be set by intializing the printer in accordance with the information stored in this NVRAM 1-12. On the other hand, an application program 2001 operating on the host computer 2000 generates form data in PDL format to be registered in the printer control system by using a printer driver program 2002, and stores the form data in the hard disk 2003 in the host computer 2000. At that time, the printer driver (program) is directly outputted to the hard disk 2003 in the host computer instead of the interface 1-11.

Form file stored in the hard disk 2003 is transferred to the printer control unit 1001 before the post-entering print data, and is then stored in the flash memory 1-3. Incidentally, a storage device for storing form data is not limited to the aforementioned flash memory. Form data may be stored in another memory card or in RAM 1-6.

In the printer system configured in this manner, form data in PDL format received from the host computer 2000 is stored in the flash memory 1-3. Further, when issuing a form rasterizing instruction, the form data is read therefrom. Moreover, print data, such as character codes and figure drawing data, contained in the form data are classified according to the corresponding band position correspondingly to the designated printing position, and are stored in the page buffer 1-6c in RAM 1-6. Furthermore, after the form data of one page is stored in the page buffer 1-6c, bitmap images respectively corresponding to bands are generated one by one in the band memory 1-6b. Additionally, after coded by the encoding/decoding portion 1-10, coded form image of one page and form generation information representing the generation conditions at the time of generating the form image are stored in the cache memory 1-6d of RAM 1-6.

On the other hand, regarding the post-entering data, after received from the host computer 2000 and stored once in the reception buffer 1-6a, the print data such as character codes and figure data are classified according to the corresponding band position correspondingly to the designated printing position, and are stored in the page buffer 1-6c in RAM 1-6. Then, after the form data of one page is stored in the page buffer 1-6c, form images respectively corresponding to the bands are read out of the cache memory 1-6d. Subsequently, while the bitmap images are restored from the data coded respectively corresponding to the bands by using the encoding/decoding portion 1-10, the restored bitmap images are transferred to the band memory 1-6b. Thereafter, the rasterizing of both of the post-entering data read out of the page buffer 1-6c and the same form image (data) read out of the band memory 1-6b is performed. Thus, an image is synthesized from the bitmap output image and the form image. Then, the bit information of the synthesized image is converted by a print portion I/F 1-8 into a video signal. Then, the video signal is outputted to the print portion 1-9. Further, upon completion of the herein-above-mentioned processing, the synthesized image corresponding to the (current) band is formed at a time at which the next band is formed. Moreover, the formed image is outputted to the print portion 1-9. This process is repeatedly performed until the recording of the image of one page is finished. Consequently, the image of one page (namely, an image synthesized from the image corresponding to the post-entering data and the form image) is recorded onto the recording paper.

Figure 3:
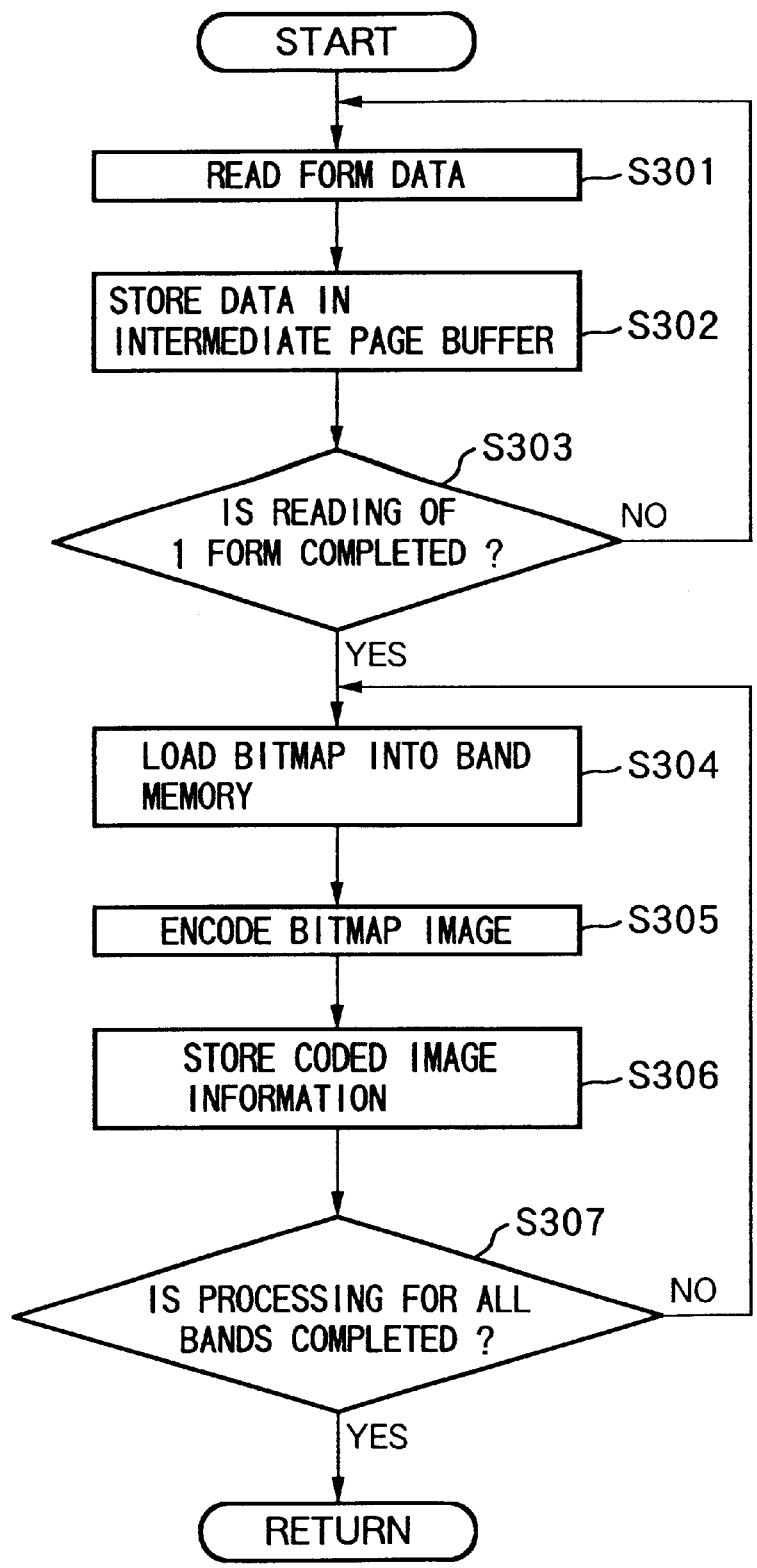
FIG. 3 is a flowchart illustrating a registration operation of registering form image data in a cache (memory) of the embodiment of the present invention.
Figure 4:
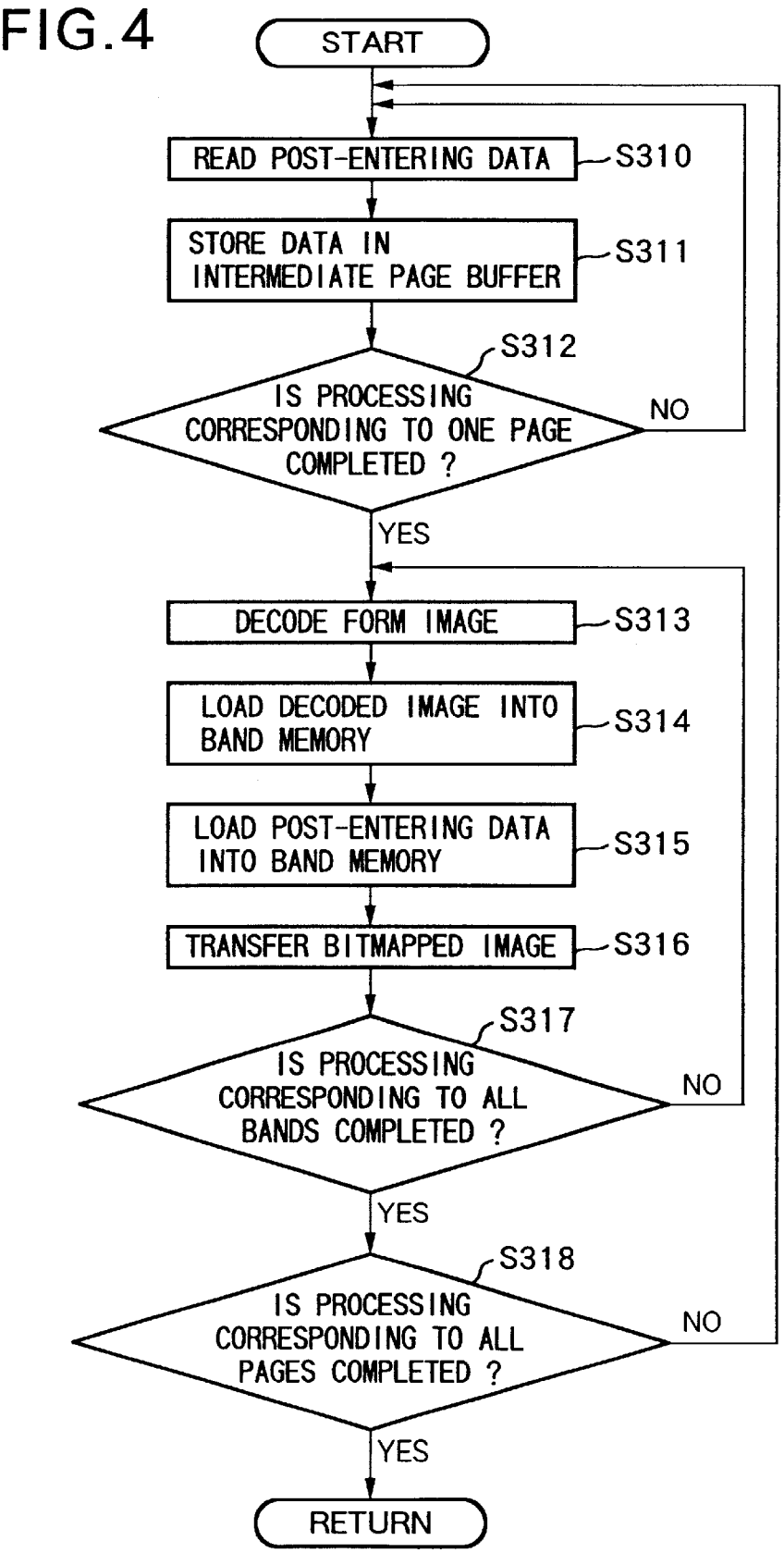
FIG. 4 is a flowchart illustrating a procedure for printing data in a first embodiment of the present invention.

Hereunder, the procedure to be performed by CPU 1-1 for performing the aforementioned operation will be described in detail with reference to the flowcharts of FIGS. 3 to 5.

First, the entire operation of the embodiment will be described hereinbelow by referring to the flowchart of FIG. 5. Incidentally, when data is transferred from the host computer to the input portion 1-5, the input portion 1-5 outputs an interrupt signal to CPU 1-1. It is assumed that, when receiving this interrupt signal, CPU 1-1 stores the received data in the reception buffer 1-6a as long as there is a free space or area (or processed area) in the reception buffer 1-6a.

First, in step S101, when data is received in the reception buffer 1-6a, the data is read therefrom. then, in steps S102, S104 and S106, it is judged whether or not the data is form registration data, whether or not the data instructs the use of a corresponding form, and whether or not the data is post-entering data, respectively.

In the case where it is judged that the data is form registration data, CPU 1-1 advances from step S102 to step S103, whereupon form data is registered in the flash memory 1-3 by setting succeeding data as form registration data. Incidentally, the form registration data consists of: command data indicating that the received data is form registration data; data representing the number of bytes of the form data; and actual form data written in PDL format.

Meanwhile, in the case where it is judged that the received data instructs the use of form data, namely, the received data representing a command to perform a form overlay operation, CPU 1-1 proceeds to step S105 whereupon preprocessing (to be described later in detail) is performed so as to use the designated form data smoothly.

Furthermore, in the case where it is judged that the received data is post-entering data, CPU 1-1 advances to step S108 whereupon a print operation (to be described later in detail) is performed by synthesizing print data from the post-entering data and the form previously designated.

Additionally, in the case where it is judged that the read (or received) data does not meet the requirements of the aforementioned three cases, CPU 1-1 advances to step S107 whereupon another (corresponding) processing is performed. However, this case is irrelevant to the present invention. Therefore, the description of such processing is omitted herein.

Next, the preprocessing to be performed in step S105 will be described hereunder with reference to the flowchart of FIG. 3.

First, in step S301, among the registered form data, form data designated by the designating command is read from the flash memory 1-3. Then, in step S302, corresponding PDL analysis is performed thereon. Thus, the form data is classified into a class or group corresponding to the printing position designated by a control code, and is then stored in the page buffer 1-6c of RAM 1-6 as intermediate data. Incidentally, at that time, the intermediate data is generated according to the angle of rotation of the designated form and to the current resolution (set by using the console panel or operating portion or by the designation command sent from the host computer). Further, the generated intermediate data is stored and managed correspondingly to each band so as to facilitate the following processing. Incidentally, in the case of data representing an image (of, for instance, a segment) drawn over two or more bands, the corresponding intermediate data are separated into bands and generated in bands, namely, correspondingly to each of the bands.

Further, in step S303, information representing the size of form print data is read. Furthermore, the aforementioned process consisting of steps S301 and S302 is repeated until it is judged that the aforementioned process for one form is completed.

In this way, all data corresponding to one form page are read. Moreover, when it is judged that all of such data are stored in the page buffer 1-6c, CPU 1-1 proceeds to S304 from step S303.

In step S304, the data is read from the page buffer 1-6c. Further, bitmap data corresponding to each band is generated in the band memory 1-6b of RAM 1-6. As previously described, the intermediate data in this case is generated correspondingly to the resolution and the printing paper size, which are designated by the host computer. Thus, what is called jaggy (or notch) does not occur in the bitmap data at all.

Then, CPU 1-1 proceeds to step S305 whereupon the bitmap data generated on the band memory 1-6b is coded and compressed in the encoding/decoding portion 1-10. Subsequently, in step S306, the coded image information is stored in the cache memory 1-6d of RAM 1-6. Further, this process is repeated until it is judged (in step S307) that intermediate data respectively corresponding to all bands, which are classified and stored correspondingly to the bands in the page buffer 1-6c.

Incidentally, if compressed form images respectively corresponding to all of the bands are stored in the cache memory 1-6d, the data stored in the page buffer 1-6c become unnecessary. Thus, the page buffer 1-6c is released and opened for the post-entering data.

Next, processing to be performed at the time of receiving the post-entering print data in step S108 of FIG. 5 will be described hereinbelow with reference to the flowchart of FIG. 4.

First, in step S310, print data (such as a control code representing a printing position and a character code) stored in the reception buffer 1-6a is read. Then, in step S311, the corresponding PDL analysis is performed on the print data. Further, the print data is thus classified into a class or group, which corresponds to a band corresponding to a printing position designated by the control code, and is stored in the page buffer 1-6c of RAM 1-6 as intermediate data. This processing is repeatedly performed until an end-of-page control code, such as a form feed instruction, is detected in the print data (in step S312).

When the post-entering data of one page is stored therein, CPU 1-1 (or the process) advances to step S313 whereupon the coded image, which is stored in the cache memory 1-6d of RAM 1-6 in bands, namely, correspondingly to each band, is decoded in the encoding/decoding portion 1-10. Further, a form image of one band, which is obtained by the decoding, is bitmapped in the band memory 1-6b of RAM 1-6 (in step S314). Then, intermediate data corresponding to the post-entering data, which corresponds to the same band, is read from the page buffer 1-6c. Further, an image synthesized from the forma image and the post-entering image is generated (in step S315). As an example of this processing, after a form image corresponding to the corresponding band, which is obtained by the decoding, is loaded into the band memory 1-6b, an image (such as a character image) based on the post-entering data may be ORed with (the form image loaded in) the band memory 1-6b.

Upon completion of the synthesis from an image corresponding to the post-entering data of one band and the form image, a synthesized bitmap image is transferred to the print portion 1-9 through the print portion I/F 1-8 (in step S316). Further, this processing is repeatedly performed until it is judged in step S317 that the printing of one page is completed.

Further, in view of the fact that there is a case where plural pages are printed in a print job, the processing to be performed in steps following step S310 is repeated until it is judged in step S318 that the printing of all pages is completed. This judgement may be made by utilizing a command indicating a job end.

As a consequence, in accordance with this embodiment of the present invention, in the print operation utilizing the form overlay, complex processing to be performed at the time of carrying out the bitmapping of an image by using the intermediate code is preliminarily done. Then, the bitmap image is registered in the cache memory 1-6d. As a result, when receiving post-entering data of plural pages, the print operation can be performed without effecting the bitmapping of the form data (in PDL format) in pages, namely, correspondingly to each page. Consequently, the print operation can be achieved at a high speed.

Especially, in the case of printing an image in bands, if the print operation is started, an operation of the printer engine cannot be stopped halfway through the print operation. In some case, for example, in the case that a certain band contains a complex portion of the form, the bitmapping of the form data is (too) late for the printing thereof. By employing this embodiment of the present invention, such a drawback of the conventional method and system is eliminated.

Moreover, in the case of this embodiment of the present invention, a form image is generated according to the print resolution and the size of printing paper, and such a form image is coded and the coded form image is stored in the cache memory, instead of varying the magnification (namely, what is called a variable power operation). Thus, a high-quality result of the printing can be obtained.

Further, in the foregoing description of this embodiment, it is described that one form image is bitmapped in the band memory 1-6b and then a (print) image is synthesized from the form image and the post-entering image. The present invention is, however, not limited to this embodiment. For example, the system of the present invention may be adapted so that an output image is synthesized from the post-entering image and a plurality of form images on the band memory 1-6b. In such a case, a form image designating command is set in the post-entering data of one page every synthesis operation.

Furthermore, the synthesizing means for synthesizing an output image from the form image and the post-entering image may be configured so that logical operations such as deletion and inversion of a part of a form earlier mapped or expanded onto the band memory 1-6b may be designated at the time of synthesizing of the output image. As a result of configuring the system in such a manner as to be able to edit the form image, the commonality of the form can be realized. Moreover, the efficiency in using the form registration memory and the cache memory 1-6d can be enhanced.

Although this embodiment has been described so that an output image is synthesized from the post-entering image and a form image after mapping the form image onto the band memory 1-6b, the present invention is not limited to such an embodiment. For instance, conversely, the system may be configured so that an output image is synthesized from the post-entering image and a form image after mapping the post-entering image onto the band memory 1-6b.

Furthermore, although the embodiment employing the banding control method has been described in the foregoing description, the system may be implemented by employing the full paint control method. Additionally, in the case of the aforementioned embodiment, the image generation processing, the coding and the decoding are performed in bands, namely, correspondingly to each band. However, the system may be configured so that the image generation processing, the coding and the decoding are performed in pages, namely, correspondingly to each page.

<Second Embodiment>

Although the aforementioned first embodiment prints plural pages by using one form a plurality of times, a second embodiment of the present invention prints plural pages by using plural forms a plurality of times in a job. For instance, the second embodiment is an example of the case that there are two forms A and B and further, each page is printed by using the forms A, B, A, B, . . . in this order. Incidentally, although taking matters out of sequence, it is assumed that the cache memory 1-6d of RAM 1-6 of the second embodiment has storage capacity sufficient to the extent that plural coded form data can be stored therein.

Figure 10:
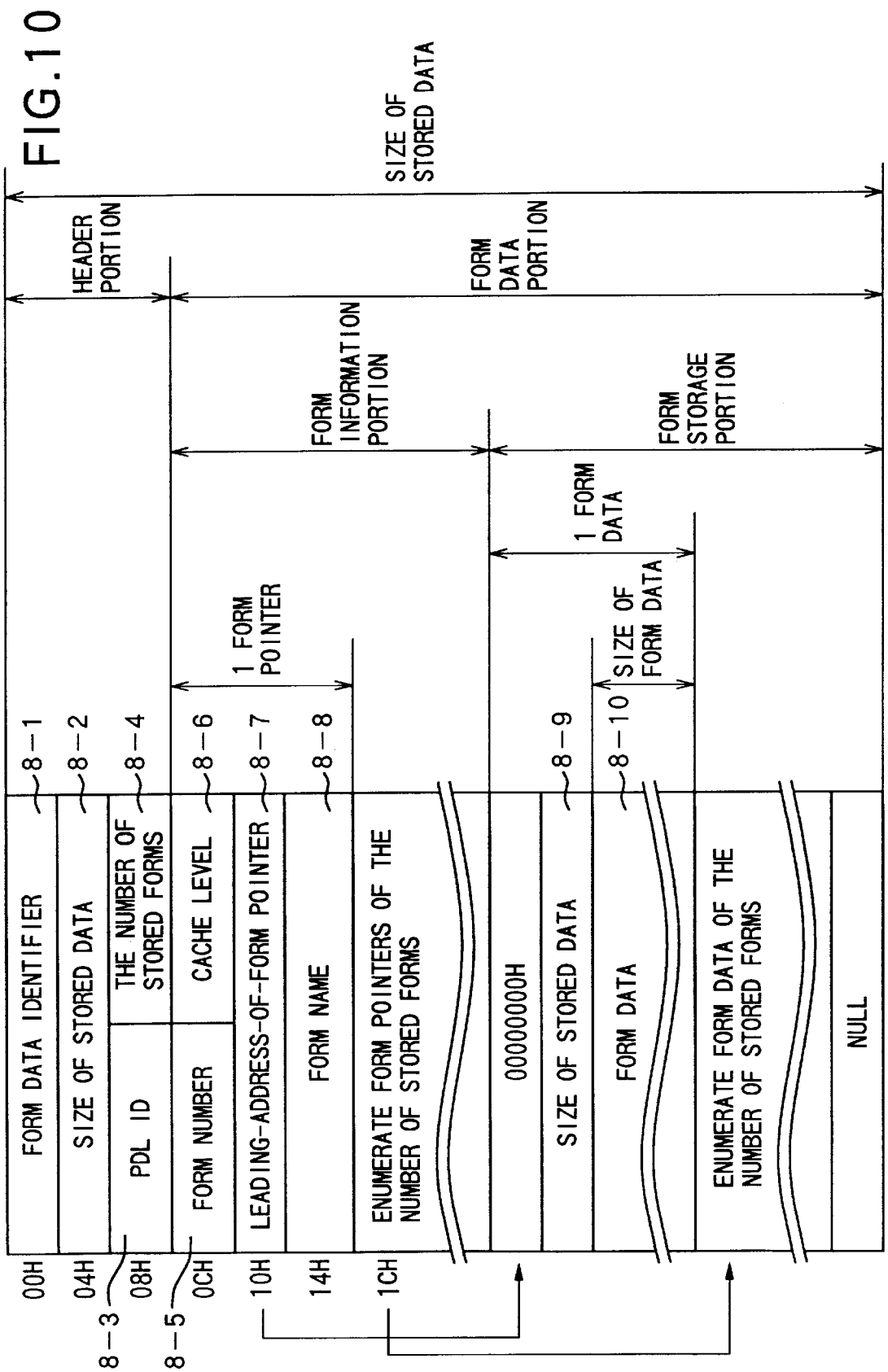
FIG. 10 is a diagram showing the format of form data registered in the embodiment of the present invention.

FIG. 10 shows the format of PDL form data (stored in the flash memory) in the second embodiment (incidentally, this may be similarly employed in the first embodiment). As shown in this figure, the form data is composed of a header portion (containing data representing a form data identifier, the size of stored data, PDL ID, and the number of stored forms) and a form data portion. Further, the form data portion contains data indicating a form number, a cache level, a storage location (or address) pointer of actual data corresponding to the form, and a form pointer representing a form name. Incidentally, the form data portion contains form pointers of the number which is equal to that of stored forms.

Figure 11:
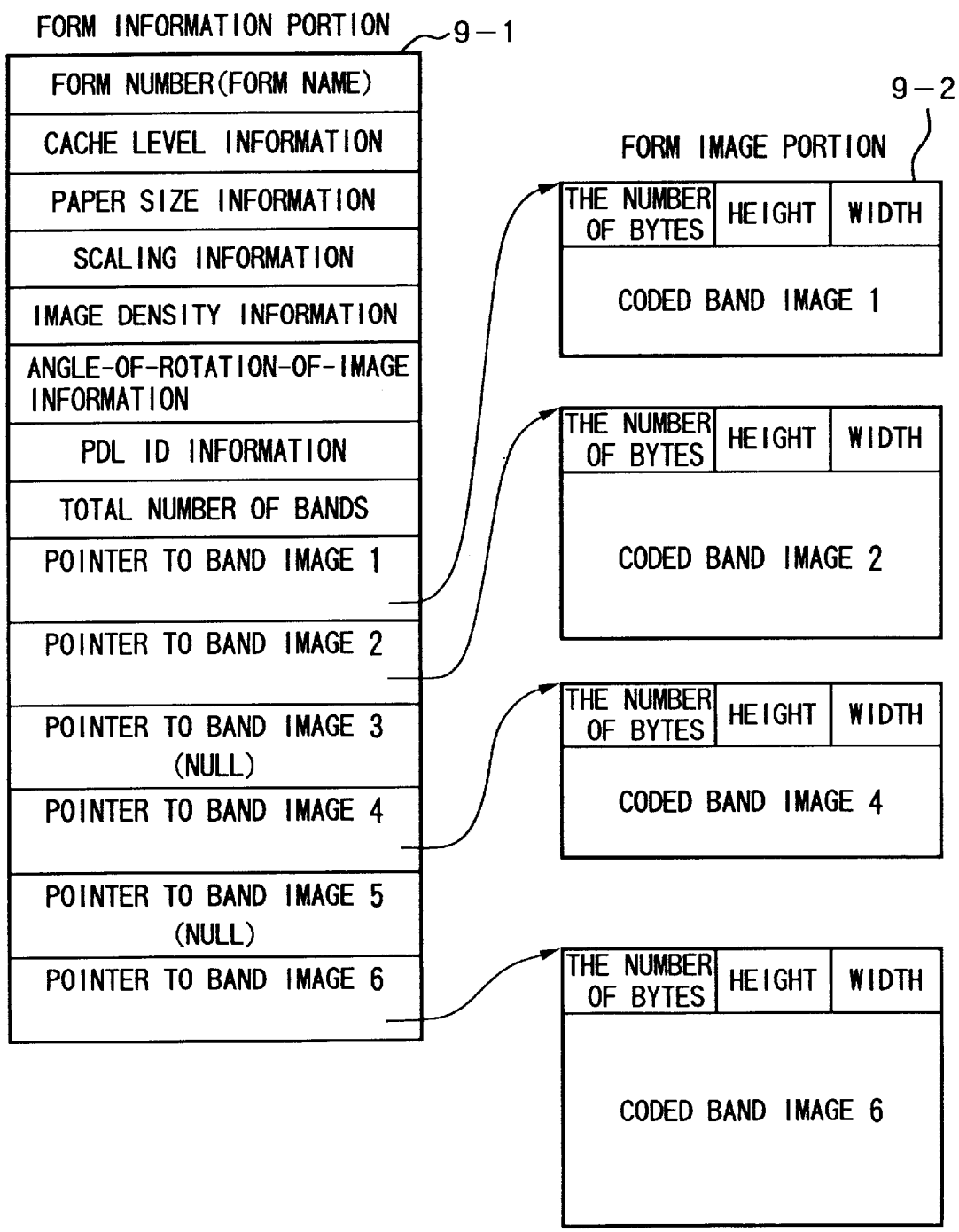
FIG. 11 is a diagram showing the format of form data stored in the cache memory of the embodiment of the present invention.

FIG. 11 shows the contents of a management table for managing one form data (namely, data coded in bands, namely, correspondingly to each band after bitmapped) stored in the cache memory 1-6d of the second embodiment.

As shown in this figure, regarding one form, form data contains data representing a number (or name) specifying this form, a cache level, a paper size information (namely, information on a paper size designated when printing the (form) overlay), scaling information (depending on a form size), pixel density information (or resolution information), angle-of-rotation-of-image information, PDL ID information, a total number of bands (namely, information indicating the number of bands over which this form extends) and a pointer (depending upon the total number of bands and) indicating an address at which the coded data corresponding to each band. In the case that there are plural forms, the cache memory contains the form data (including the data and information illustrated in this figure) of the number which is that of the forms.

Figure 9:
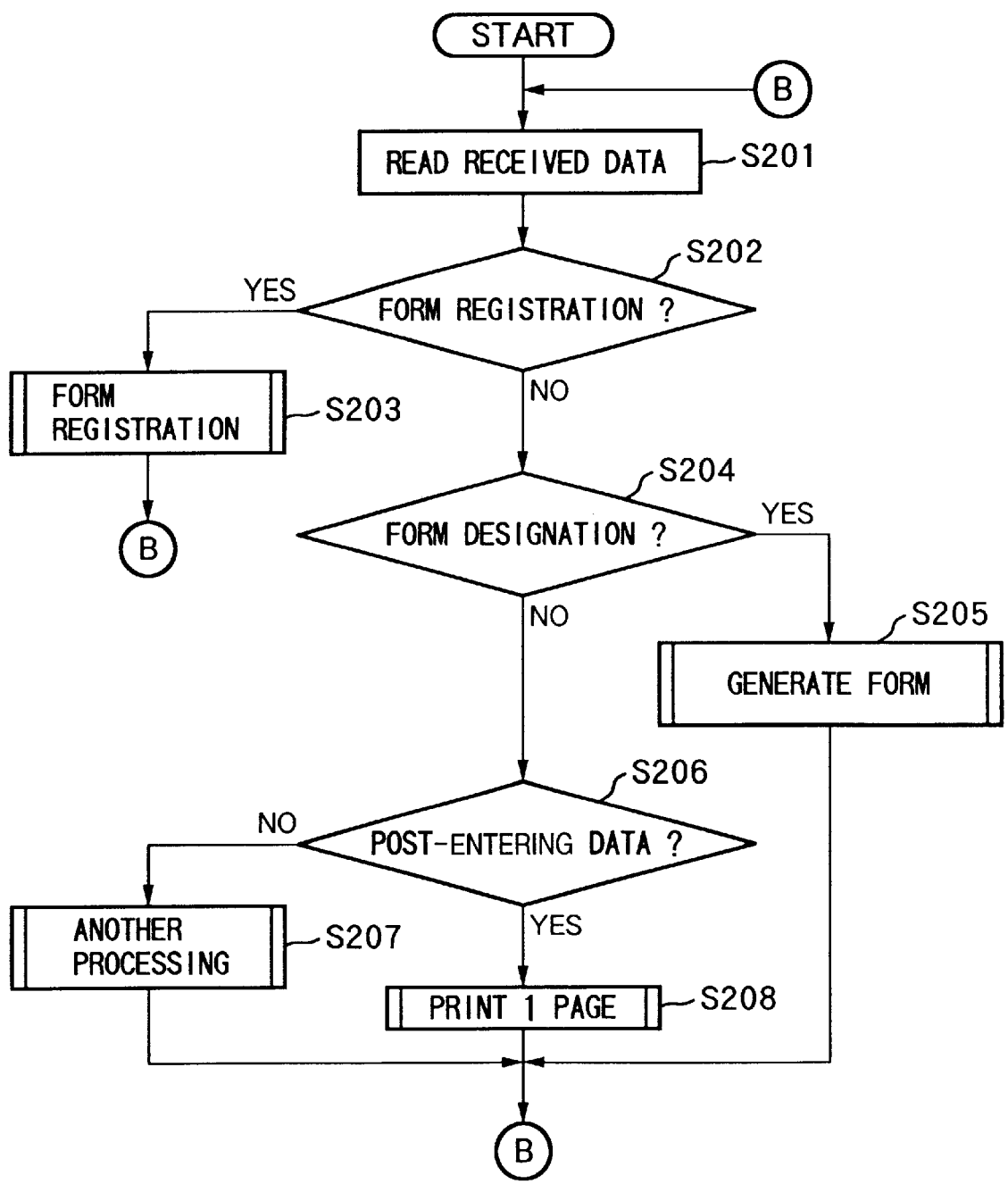
FIG. 9 is a flowchart illustrating the entire form generating operation of the second embodiment of the present invention.

FIG. 9 illustrates the procedure for performing the entire form generating operation of the second embodiment. This procedure is different from that of the first embodiment illustrated in FIG. 5 in that an image of one page is printed in step S208 in the case of the second embodiment, instead of printing plural pages corresponding to one job in step S108 in the first embodiment, and in that the processing of step S205 is performed in the second embodiment instead of that of step S105. The rest of the procedure in the case of the second embodiment is similar to the corresponding part of the procedure in the case of the first embodiment. Therefore, in the following description, only steps S205 and S208 will be described.

Figure 6:
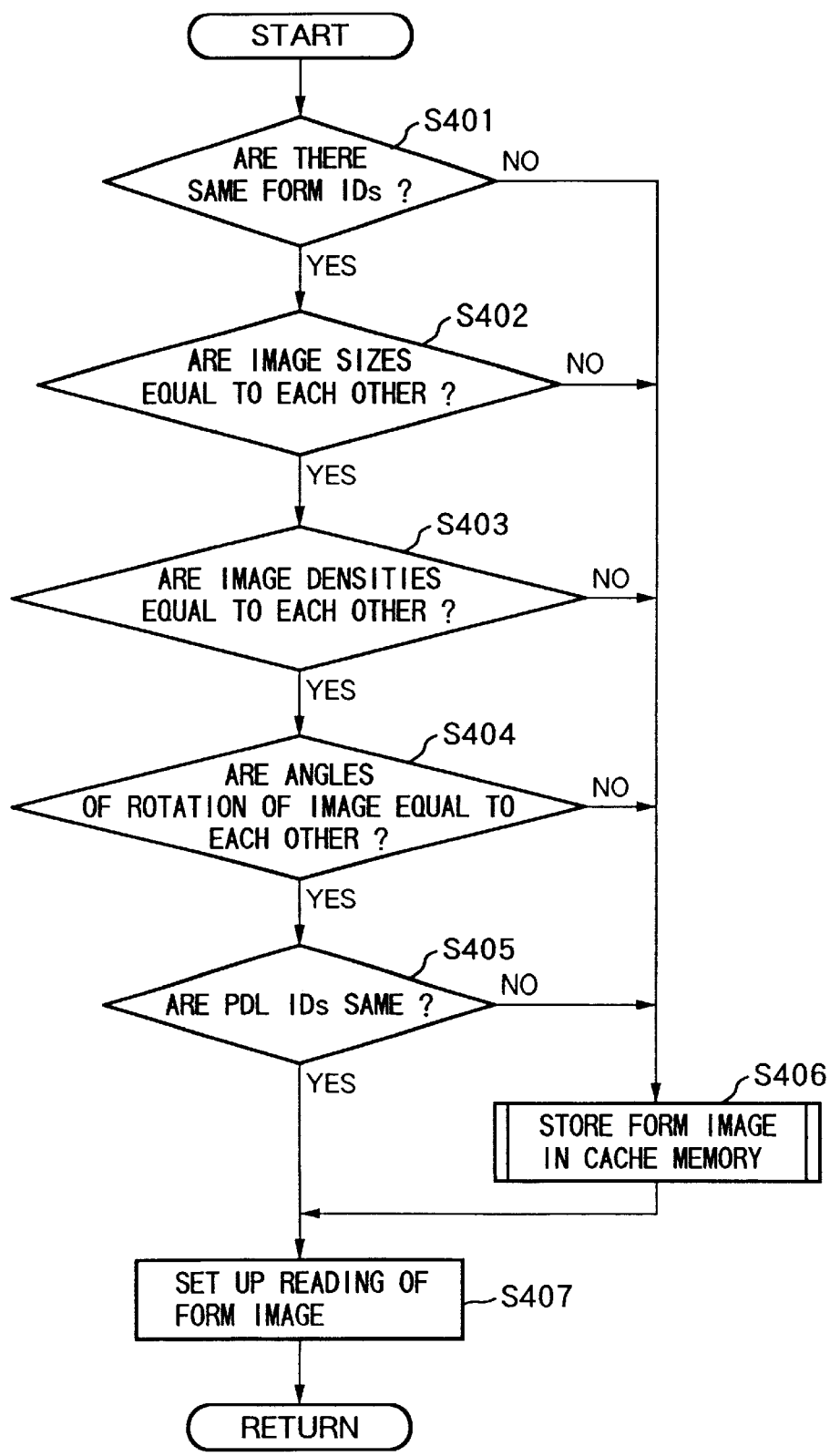
FIG. 6 is a flowchart illustrating a form generating operation of a second embodiment of the present invention.

FIG. 6 is a flowchart illustrating the processing to be performed in step S205 in the case of the second embodiment of the present invention.

First, in step S401, it is judged whether or not coded data corresponding to the same form as indicated by the designated ID (or name) is registered in the cache memory 1-6d. If it is judged that such coded data is not registered therein, CPU 1-1 advances to step S406 whereupon bitmap data corresponding to the designated ID (or name) is generated. Thereafter, such bitmap data is coded and the coded data is then registered in this cache memory 1-6d. This registration of the coded data in the cache memory 1-6d is similar to that illustrated in FIG. 3 in the case of the first embodiment. Therefore, the detailed description thereof is omitted herein.

Further, if it is judged that such coded data is registered therein, CPU 1-1 advances to step S402.

In the process consisting of steps S402 to S405, it is judged whether or not the coded data, which is stored in the cache memory 1-6d, can be used actually.

Namely, although the coded data corresponding to the same form ID (or name) is stored therein, it is judged in step S402 whether or not these coded and registered data are matched with each other in respects of the form to be overlaid, the scaling factor of the form image, which are stored therein, and the paper size stored therein. Further, in step S403, it is judged in step S402 whether or not these coded and registered data are matched with each other in respect of the bitmap image density (such as generation resolution). Moreover, in step S404, it is judged whether or not these coded and registered data are matched with each other in respect of the angle of rotation of the image. Furthermore, in step S405, it is judged whether or not these coded and registered data are matched with each other in respect of PDL ID representing PDL format or type of original data (or registered data) of the generated image.

In the case that all of the requirements or conditions checked in steps S401 to S405 are satisfied, it is judged that the form data stored in the cache memory 1-6d can be used. Thus, the form to be used is set so that the coded data stored in the cache memory 1-6d.

In contrast, if "NO" is obtained as a result of one of the aforementioned judgments, it is concluded that the coded data of the necessary form is not stored in the cache memory 1-6d as previously described. Thus, CPU 1-1 proceeds to step S406 whereupon the corresponding form data is read from the flash memory 1-3 and then the bitmapping and the coding are performed correspondingly to each band and finally, resultant data is stored in the cache memory 1-6d. Upon completion of the processing of step S406, CPU 1-1 advances to step S407 whereupon a setting operation is performed so as to use the data registered in the cache memory 1-6d.

Figure 7:
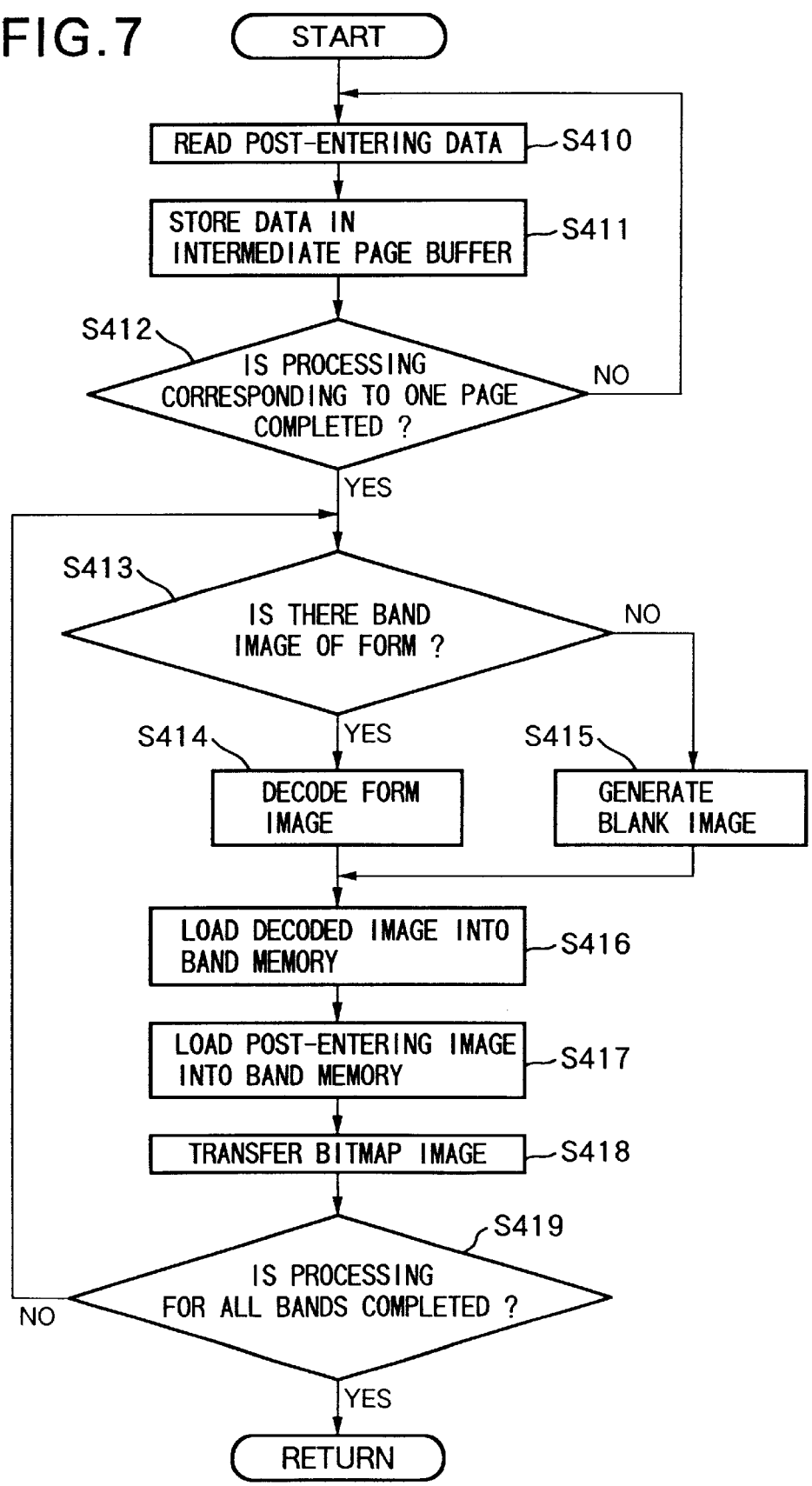
FIG. 7 is a flowchart illustrating a procedure for printing data of one page in the second embodiment of the present invention.

Next, the processing (namely, the printing of data of one page) of step S208 of FIG. 9 will be described hereinbelow by referring to the flowchart of FIG. 7.

First, in step S410, the reading of the post-entering print data (such as the control codes indicating the printing positions and the character codes) is performed. Subsequently, CPU 1-1 goes forward to step S411 whereupon PDL analysis is performed on input data. The print data are classified into groups respectively corresponding to bands which correspond to the printing positions designated by the control codes, and are stored as intermediate data in the page buffer 1-6c of RAM 1-6. Then, the process consisting of steps S410 and S411 is repeated until it is judged (in step S412) that the processing of the data of one page is completed.

Meanwhile, upon completion of the generation of the intermediate data of one page in bands, CPU advances from step S412 to step S413 whereupon it is judged whether or not there is a form band image corresponding to a target band of a target page. If such a form is used in, for instance, 5th to 10th bands but the target band is other than such bands, a result of this judgement is negative, namely, "NO". Thus, a blank image is generated (in step S415). Subsequently, in step S416, the blank image is loaded into the band memory 1-6b. Conversely, in the case of the recording in 5th to 10th bands, the necessary form is present, so that results of the judgments are affirmative, namely, "YES". Thus, the coded image data of the form in the corresponding band is decoded (in step S414). Then, the image data obtained by the decoding is loaded into the band memory 1-6b (in step S416).

In the next step S417, a bitmap image is synthesized and mapped in the band memory 1-6b on the basis of the intermediate data of the post-entering data corresponding to the target band. Further, upon completion of this synthesis and mapping, CPU 1-1 proceeds to step S418 whereupon the bitmap image data loaded in the band memory 1-6b corresponding to the target band is transferred to the print portion 1-9 through the print portion I/F 1-8.

Further, the process consisting of steps subsequent to the aforementioned step S413 is repeated until the bitmap image of one page is transferred to the print portion (in step S419).

Incidentally, when the printing of the data of one page is completed, the page buffer 1-6c for the post-entering data is released. Moreover, although the cache memory 1-6d for storing the coded image of the form image has been described as provided in RAM 1-6, the position of this cache memory is not limited thereto. For instance, the cache memory 1-6d may be present in the flash memory 1-3 controlled by MC1-7.

As is understood from the forgoing description, the aforementioned processing, namely, the printing of data of one page is summarized or described again briefly as follows with reference to the flowchart of FIG. 9.

When the form data registration instruction is sent from the host computer 2000, such form data is registered in the flash memory 1-3 (in step S203). Further, when information specifying a form to be used in a job is sent therefrom, the specified form data is read from the flash memory 1-3 and is bitmapped according to the designated size and the designated resolution and is further compressed and coded correspondingly to each band. Then, the coded data is registered in the cache memory 1-6d. Further, when receiving the post-entering data, a form designated in the post-entering data is read in bands from the cache memory 1-6d. Then, after decoded, an output image is synthesized from the decoded data and the bitmapped post-entering data. Subsequently, the synthesized image is printed out.

Although it has been described in the forgoing description that the retrieving operation of the form image is performed according to the image size, the image density, the angle of rotation of the image and PDL ID, such an operation is changed according to the image generation ability of the apparatus. For example, in the case of the apparatus which can treat or handle multi-valued images (or multi-tone-level images), each pixel of which can be presented by using halftone levels, tone-level information is employed as an object of the retrieval (or used as a key for the retrieval). Moreover, for instance, in the case of a color printer which is configured so that a pixel image is provided correspondingly to each color component, color component information is an object of the retrieval (or used as a key for the retrieval).

Furthermore, in the foregoing description, it has been described that the first and second embodiments of the present invention employ the banding control method. However, such apparatuses may be implemented by employing the full paint control method. In this case, although the image processing, the coding and the decoding may be performed in bands, such processing can be performed in pages in the apparatuses.

Figure 8:
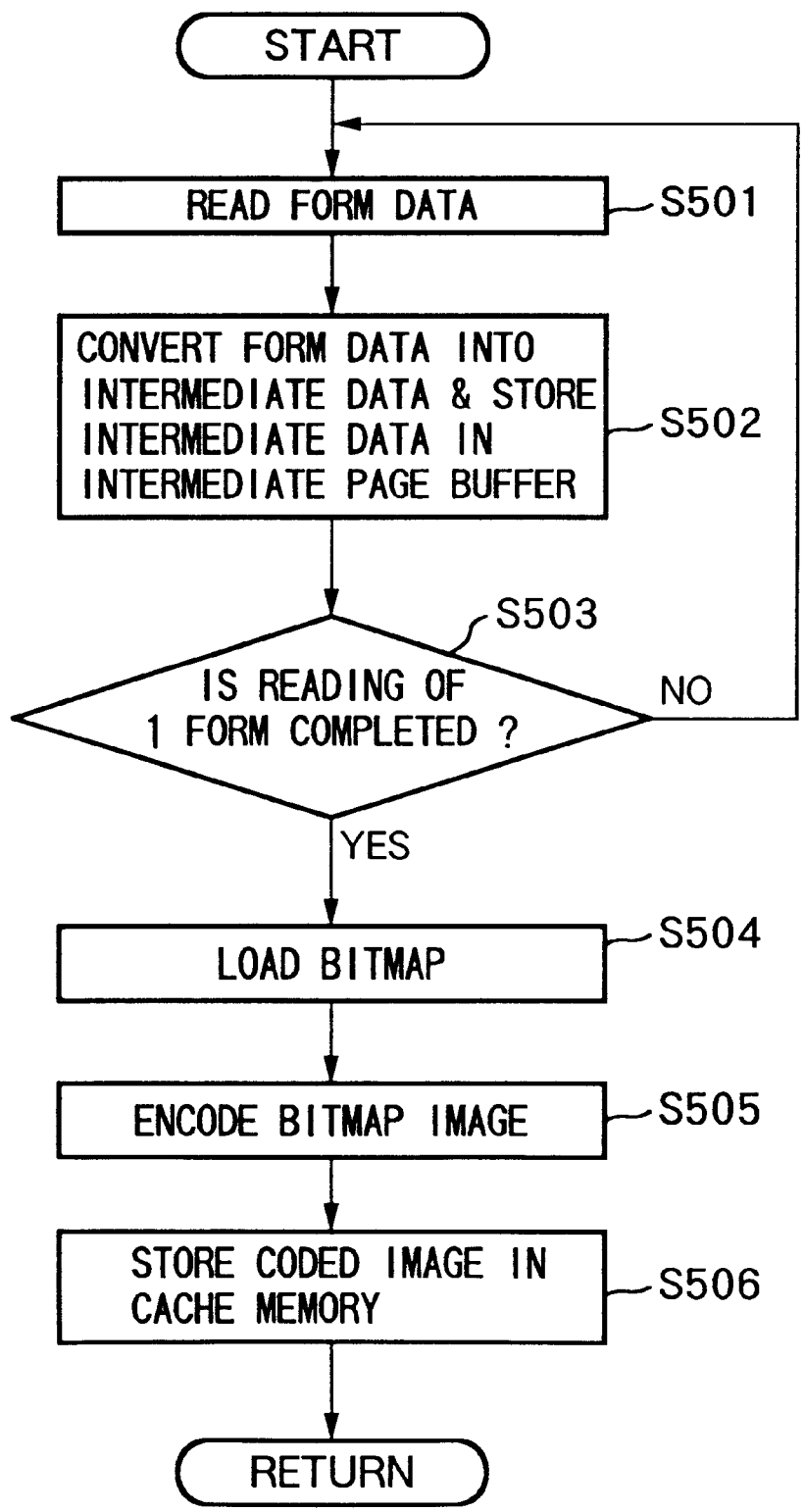
FIG. 8 is a flowchart illustrating another example of the registration operation of registering form data in a cache (memory) of the second embodiment of the present invention.

FIG. 8 is a flowchart illustrating processing to be performed in the case of registering form images in the cache memory 1-6d in pages, namely, correspondingly to each page, instead of the processing of step S406.

First, the corresponding form data (namely, data written in PDL format) is read in step S501. Then, the form data is converted into intermediate data in step S502 (according to the manner designated (by the angle-of-rotation-of-image information and the size information). Further, the intermediate data is stored in the page buffer 1-6c. Further, the process consisting of steps S501 and S502 is repeated until the processing of the data of one page is completed.

When the intermediate data of one page is generated, CPU 1-1 advances to step S504 whereupon the bitmapping of the data of one page is performed. Further, coded data is generated by the coding of the intermediate data (in step S505) and the coded data is registered in the cache memory 1-6d (in step S506).

Incidentally, although the bitmapping of the form of one page is performed in the case of the herein-above-mentioned processing after the intermediate data of one page is generated, the bitmapped image may be generated simultaneously with the generation of intermediate codes in the case of the apparatus employing the full paint control method. In some case, the bitmapping may be directly performed without generating intermediate codes. In this case, although the processing speed is reduced slightly, the occupied area in the memory is decreased.

Moreover, in the case of an apparatus which can print color output images, color component information and band pointers respectively corresponding to the color components are provided in the form information portion (9-1). Moreover, it is necessary to repeat the generation and storage of a bitmap image corresponding to each color component.

<Third Embodiment>

Figure 12:
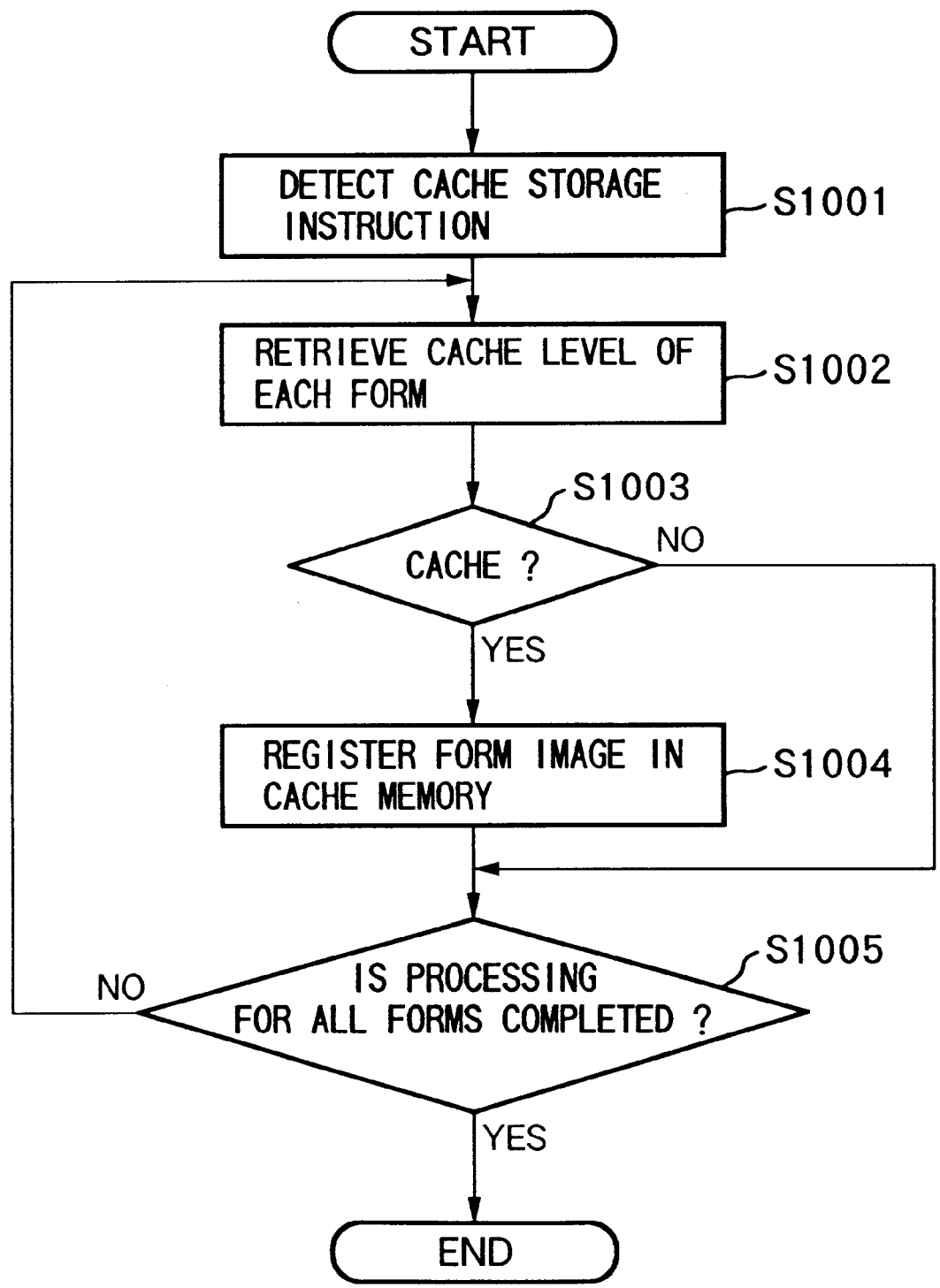
FIG. 12 is a flowchart illustrating a procedure for registering a form in a third embodiment of the present invention.

FIG. 12 is a flowchart illustrating a procedure for generating a form image in a printer which is a third embodiment of the present invention.

Incidentally, it is assumed that forms are preliminarily registered in the flash memory 1-3 of the printer 1000 as illustrated in FIG. 10 before such processing is performed. Further, it is supposed that, in NVRAM 1-12 which can be changed by an operator from the console panel 1012, there is stored switching information used for indicating whether or not such processing should be performed.

When turning on the power supply switch of the printer 1000, CPU 1-1 performs various initialization processing by executing programs. During the initialization, if it is detected (in step S1001) that a cache registration instruction flag stored in NVRAM 1-12 which is set or reset (namely, turned on or off by using the console panel or an instruction or command dedicated therefor) is set, namely, "ON", a form data identifier (8-1) provided in the flash memory 1-3 is retrieved and further, data representing a cache level (8-6), which is stored correspondingly to each of the registered forms, is read (in step S1002). Next, it is judged (in step S1003) whether or not a form corresponding to the read cache level (8-6) is stored in the cache memory 1-6d of RAM 1-6. In the case of this embodiment, a form corresponding to a high cache level is preferentially stored therein. If it is judged that the corresponding form is cached, the rasterizing of the form is performed as previously described with reference to FIG. 8. Further, the coded form image is stored in the cache memory 1-6d (in step S1004). At that time, there is no post-entering data generation information. Consequently, the generation of the form image is performed under default conditions in the printer 1000.

In contrast, if it is judged in step S1003 that there is no necessity for caching the corresponding form, another cache level corresponding to the next form is read. Thereafter, such a process is repeated until all of the registered forms are retrieved.

In this manner, bitmapped form images are preliminarily generated before the post-entering print data is inputted. Further, the apparatus is adapted so that the bitmapped form images can be selected in the cache memory retrieving process consisting of steps S403 to S407, which is described in the foregoing description of the second embodiment, when the post-entering print data is inputted. Thereby, the third embodiment has an advantage in that even a time required to generate form data first utilized can be reduced.

Especially, a form having a high frequency of use can be preliminarily registered in the cache memory by setting the apparatus so that the aforementioned processing is automatically performed when turning on the power supply. Thus, a high-speed form overlay printing operation can be achieved in daily (routine) work.

Incidentally, if the capacity of the cache memory 1-6d is sufficient, the image of a form corresponding to the next cache level is loaded therein and is then stored in the cache memory 1-6d. Further, the cache level of each form can be freely set by a user from the console panel, and may be set by sending a command, by which the cache level corresponding to each form, from the host computer. In the latter case, it is necessary to know what form is cached. Thus, the printer is connected with the host computer through a bidirectional communication interface. When receiving an inquiry command, the information on the forms registered in the flash memory and the information on the forms actually registered in the cache memory 1-6d are sent to the host computer. When the printer driver provided at the side of the host computer receives such information, the reduced image of each form together with the corresponding cache level is displayed on the screen of the display device. Further, if there is an instruction or command (for setting a cache level) sent from the host computer, the printer driver receives such a command, and further changes the cache level of the corresponding form.

Figure 13:
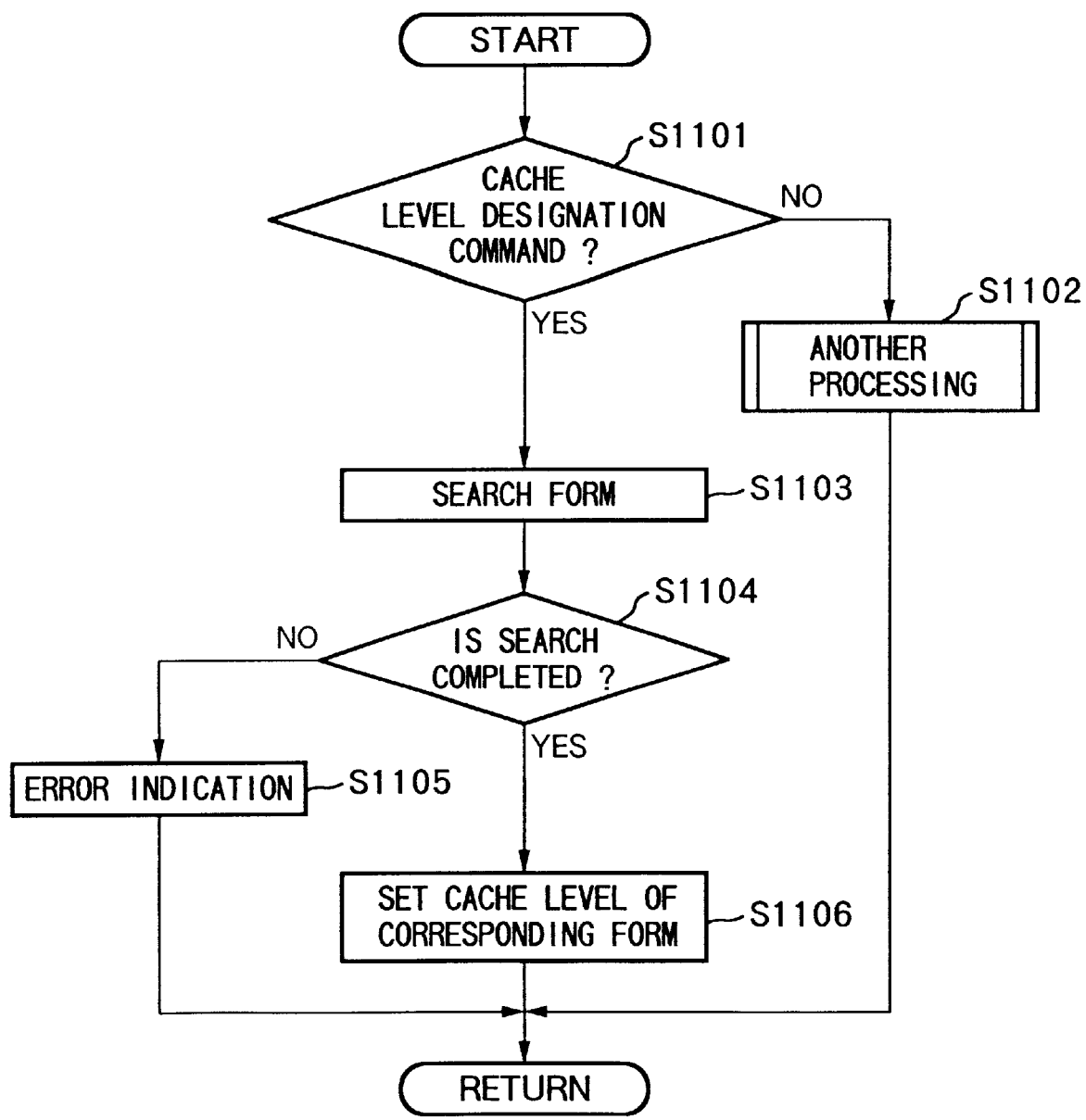
FIG. 13 is a flowchart illustrating a procedure to be followed in the third embodiment of the present invention when receiving a cache level designating command.

FIG. 13 illustrates the procedure in the case that the printer driver receives this cache level designation command. Incidentally, it suffices to perform this processing in step S107 of FIG. 5.

First, in step S1101, it is judged whether or not the received data represents a cache level designation command. If judged that the received data is other than data representing the cache level designation command, CPU 1-1 advances to step S1102 whereupon the corresponding processing is performed.

Further, if it is judged that the received data represents a cache level designation command, the corresponding form data is searched for and found in the flash memory 1-3 in accordance with the form designation information contained in the command. If not found, CPU 1-1 proceeds from step S1104 to step S1105 whereupon error processing (for example, the information indicating the absence of the corresponding form is sent back to the host computer and further, a message indicating such a fact is displayed on the screen of the console panel) is performed. Then, this operation is terminated.

In contrast, if the corresponding form is found, the cache level of the corresponding form is changed into the designated level so as to change the cache level corresponding to the form. Then, this operation is terminated.

Incidentally, in the case of the herein-above description, it has been described that when turning on the power supply, a form having a high cache level is registered in the cache memory 1-6d. The present invention is, however, not limited to this embodiment. For example, the registration of a form may be performed in a print standby state in which the printing of the post-entering print data is not performed. In this case, the registration of a form may be performed when instructing the registration by using the console panel or when receiving a command dedicated to perform the registration thereof.

<Fourth Embodiment>

In the foregoing description, there has been described an example in which, when turning on the power supply, image data of a form having a high cache level is generated according to the cache level and the generated image data is compressed and coded and further, the condensed image data is registered in the cache memory 1-6d (incidentally, it has been already described that the cache level can be set by an instruction or command sent from the console panel or the host computer). However, it has been described that the cache level of each form is represented by each form data stored in the flash memory 1-3 in the case of the third embodiment. Generally, in the case of the flash memory, the rewriting of data is performed in blocks and there is a limit to the number of times of rewriting data. Therefore, it is not preferable that a cache level is registered in a flash memory.

Thus, in the following description of the fourth embodiment of the present invention, there will be described an example that, when turning on the power supply, a form, which should be registered in the cache memory 1-6d in the case of the previously described embodiments, is registered in NVRAM 1-12 (namely, RAM backed up by a battery (not shown)). Although it depends on the form cache generation instruction data, which is preliminarily sent from the host computer and registered, what form is registered in the cache memory 1-6d when turning on the power supply, such form cache generation instruction data is stored in NVRAM 1-12 in the fourth embodiment. An example of the form cache generation instruction data is shown in FIGS. 15A and 15B.

Figure 5:
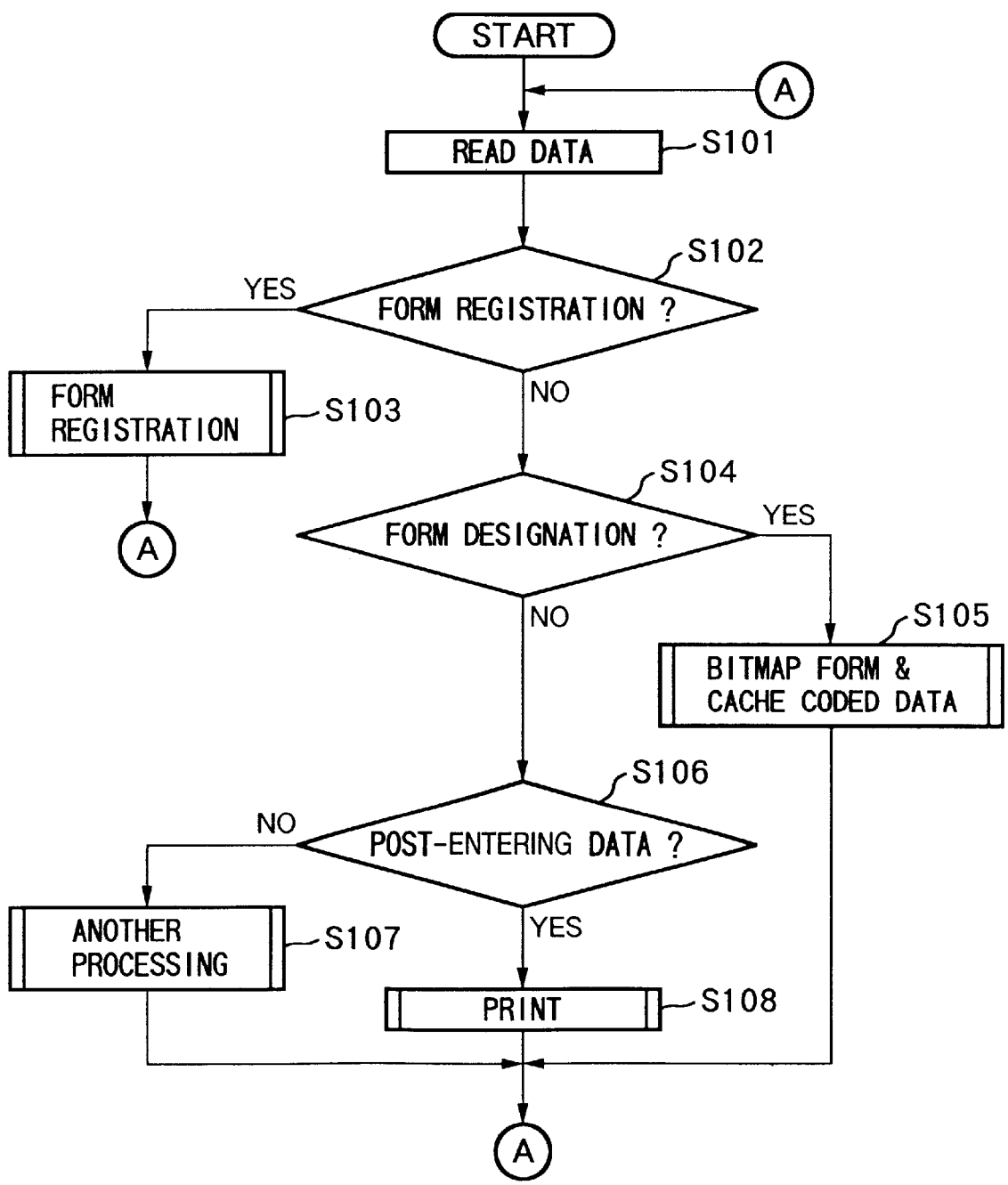
FIG. 5 is a flowchart illustrating the entire procedure for printing data in the first embodiment of the present invention.
Figure 14:
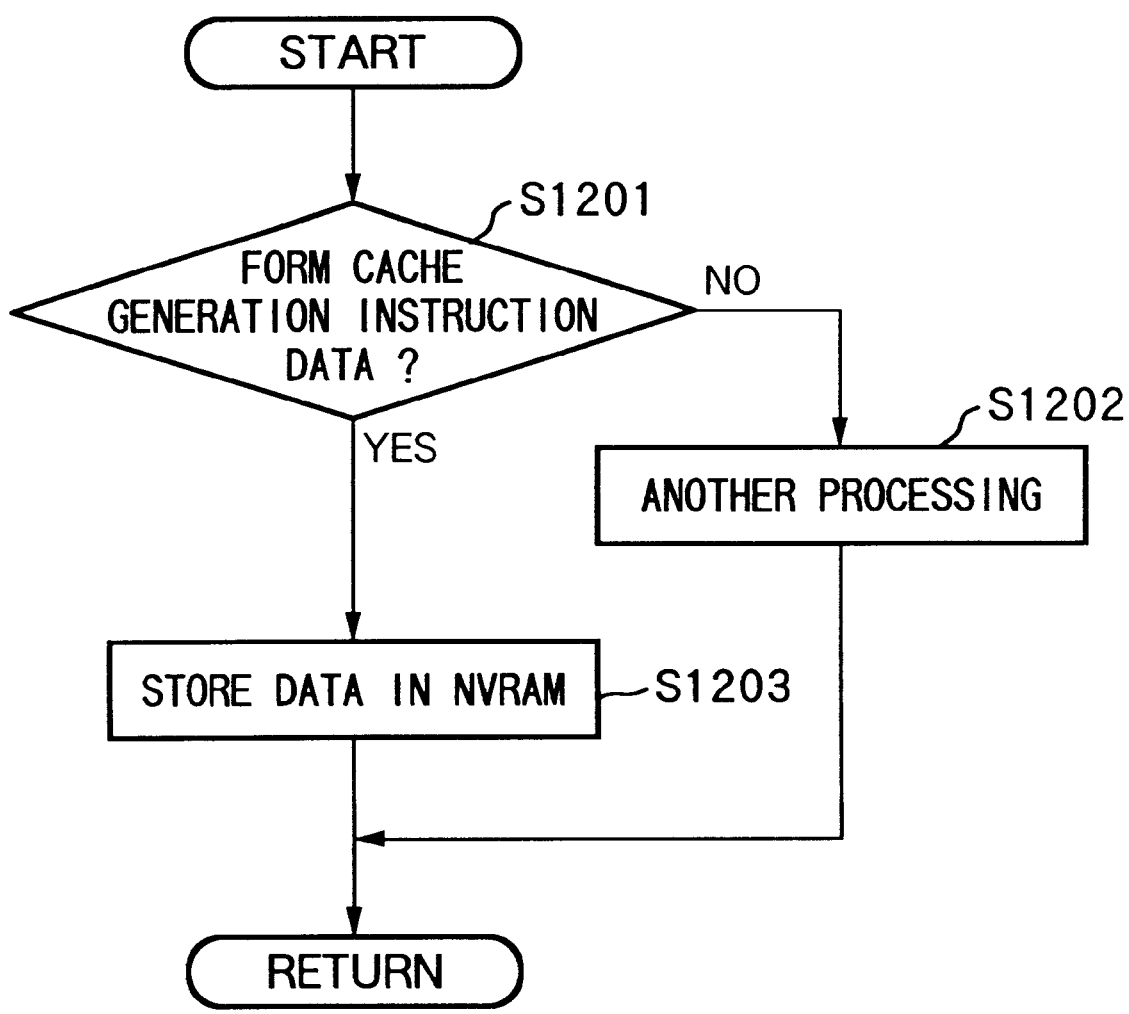
FIG. 14 is a flowchart illustrating a procedure to be followed in a fourth embodiment of the present invention when receiving form cache generation instruction data.

Processing in the case of receiving this form cache generation instruction data is performed in step S107 illustrated in FIG. 5. FIG. 14 illustrates this processing to be performed in step S107.

First, it is judged in step S1201 whether or not the received data is form cache generation instruction data. If not, the processing corresponding to such a case is performed. Further, if it is judged in step S1201 that the received data is form cache generation instruction data, CPU 1-1 proceeds to step S1203 whereupon the data is stored in NVRAM 1-12. Then, this processing is terminated.

Next, processing to be performed when turning on the power supply in the fourth embodiment will be described hereunder with reference to the flowchart of FIG. 16. As is previously described, even when the power supply for this apparatus is interrupted, data stored in NVRAM 1-12 is held or maintained. Incidentally, in the following description, the cache registration flag is provided or secured at a predetermined address in NVRAM 1-12. This flag holds information indicating whether or not the processing for registering form data, which is stored in the flash memory 1-3, in the cache memory 1-6d is performed. Further, the on-state/off-state of this flag can be set from the console panel. Alternatively, this flag can be set or reset by using a predetermined command sent from the host computer.

Meanwhile, when turning on the power supply for the printer 1000, CPU 1-1 performs various kinds of initialization processing according to programs stored in the program ROM 1-2 (in step S1301). In the initialization processing, this apparatus is first initialized according to default processing resolution information and to default tone level. Further, the allocated capacity of the cache memory 1-6d, which is set from the console panel, is read from NVRAM. Moreover, the cache memory 1-6d of RAM 1-6 is provided or secured. In addition, the setting of the memory configuration of the work memory and the band memory 1-6b is performed. Incidentally, form data may include not only ruled lines but characters.

Further, the reasons why the memory configuration processing is necessary are as follows.

For instance, in the case that a 10-point character is generated by executing a font-scaler program for generating bitmap fonts from outline fonts stored in ROM 1-2, a bitmap (or bitmapped) image of about 42 dots by 42 dots corresponding to the character is obtained at a 300 dpi resolution. However, at a 600 dpi resolution, a bitmap image of about 83 dots by 83 dots should be generated correspondingly to the character. Thus, the work memory for tentatively storing the generated bitmap image should have a memory capacity which is 4 times the necessary memory capacity thereof in the case where the resolution is 300 dpi. In addition, in the case of presenting figures such as a curved line and a circle are presented, if the resolution becomes different though the figure has the same size, the number of coordinate points composing the figure increases with an increase in resolution. Thus, the work memory for a painting (or filling) operation should be increased.

Further, regarding the band memory 1-6b, in the case of outputting a 600 dpi image, larger capacity of the band memory 1-6b is needed, as compared with the case of outputting a 300 dpi image. Although the apparatus can operate by using the same band memory 1-6b, the length of a time period for generating a bitmap image in synchronization with the conveyance of the printing paper is reduced. Thus, the apparatus still has a drawback in that the possibility of a failure in generating such a bitmap image (namely, of an occurrence of a print overrun error) increases. Consequently, it is preferable that the band memory 1-6b having a sufficient storage capacity corresponding to the resolution is provided or secured in the apparatus.

Subsequently, CPU 1-1 advances to step S1302 whereupon it is judged whether the cache registration flag in NVRAM 1-12 is ON or OFF (namely, set or reset). If this flag is OFF (namely, is reset), this processing is terminated without registering the form image in the cache memory 1-6d. Then, CPU 1-1 moves to print-data reception standby processing (for instance, performs the processing illustrated in FIG. 5).

In contrast, if the cache registration flag is ON (namely, is set), CPU 1-1 advances to step S1303 whereupon it is judged whether or not there is at least one form cache generation instruction data (see FIGS. 15A and 15B) in NVRAM 1-12.

The form cache generation instruction data has an identification header (not shown) at the leading address thereof. By reading the identification header, it is checked whether at least one form cache generation instruction data is contained therein. If it is judged that the form cache generation instruction data is present therein, the generation instruction data is read therefrom (in step S1304).

As shown in FIGS. 15A and 15B, the form cache generation instruction data includes various kinds of configuration setting instructions for generating images, namely, includes information on the setting of the memory configuration of the work memory and the band memory 1-6b of RAM 1-6, which are used for executing an image processing program stored in ROM 1-2; and offset information on the binding margin of the image. Therefore, in step S1305, the setting of various kinds of configurations is performed in accordance with these setting instructions. Upon completion of the setting of various kinds of configurations, the process, thus, CPU 1-1 proceeds to step S1306 whereupon the form data stored in the flash memory 1-3 is interpreted according to the information (for example, the resolution and PDL interpreter for interpretation of data) set in the previously read form cache generation instruction data. Moreover, the intermediate data corresponding to the form data is generated in the page buffer 1-6c. Subsequently, CPU 1-1 advances to steps S1307 and S1308. Further, image data is loaded into the band buffer correspondingly to each band, and registers the image data in the cache memory 1-6d. This is the same with the aforementioned first embodiment.

Thereafter, CPU 1-1 returns to step S1303 whereupon it is judged whether or not there is any form cache generation instruction data to be next processed. Further, the aforementioned process is repeatedly performed as long as such form cache generation instruction data is present.

Thus, when turning on the power supply, bitmapped form images are preliminarily generated before the post-entering data is received. Consequently, the form images can be registered in the cache memory 1-6d. Moreover, when the post-entering data is inputted, the form cache images, which are generated under the same conditions as the conditions for generating the post-entering data, can be retrieved and selected, as described in the foregoing description of the cache memory retrieval processing which is illustrated in FIG. 6 and described in the description of the second embodiment.

Hereinafter, the form cache generation instruction data used in the fourth embodiment will be described in detail.

FIGS. 15A and 15B show an example of the form cache generation instruction data to used in a printer which is the fourth embodiment.

Regarding the form cache generation instruction data of FIG. 15A, a bitmap image is generated at a resolution of 600 dpi and is stored in the cache memory 1-6d. Moreover, FIG. 15B illustrates the form cache generation instruction data in the case of generating an image at a processing resolution of 300 dpi.

As is previously described, the form cache generation instruction data is registration job data that prescribes the form image registration to be performed when carrying out the bitmapping of the form data and storing the bitmapped image data.

Therefore, this form cache generation instruction data includes data concerning the following 13 instructions in addition to the data concerning the aforementioned instructions:

1. Job initiation instruction which indicates the initiation of a job of registering the form image;
2. Processing-resolution designating instruction for setting the processing resolution at which subsequent PDL data is processed; and
3. Processing-tone-level designating instruction for designating tone levels to be processed.

Incidentally, the setting of the memory configuration of the memory areas of RAM 1-6 is performed according to the designated resolution and the tone level information. Further, the processing of the subsequent PDL data according to the designated resolution and the tone level information.
4. Paper carrying direction setting instruction which designates a direction (a longitudinal feed direction/a lateral feed direction) in which the recording paper is carried;
5. Binding width setting instruction and Binding direction setting instruction which designate an output image and the positions, at which the output image is mapped, when binding sheets of printing paper:
6. PDL conversion instruction for instructing to activate PDL analyzing program so as to process the subsequent PDL, the generation of the form cache image of which is instructed;

This is provided so as to deal with the case that the printer has plural emulation functions for interpreting plural printer languages. Printer having plural emulation functions is publicly known. Thus, the description thereof is omitted. Form data written in various languages can be registered in the flash memory by applying this instruction to the printer embodying the present invention. In addition, at a stage at which the form image is actually used, the form is presented by common compressed image, instead of data written in the printer language format. Therefore, the post-entering data and the form data can be utilized even if the printer language used for describing the post-entering data is different from the language used for describing the form data.

7. PDL data (generation) initiation instruction for initiating the generation of a form cache image;
8. Scale designation instruction for setting the scale when drawing an input image by performing expansion/reduction of the input data;
9. Paper size designation instruction for designating the paper size of paper on which the form cache image is generated;
10. Deletion level designation instruction for designating a time at which the form cache image bitmapped and stored in RAM 1-6;

There are two deletion levels. One of the deletion levels is "0" at which the form cache image can be deleted only by a form cache image deletion command (sent from the host computer). The other is "1" at which the form cache image is automatically deleted when exhaustion of memory occurs during image data of another form is stored in the cache memory 1-6d of RAM 1-6. Therefore, in the case that the remaining memory capacity of the cache memory 1-6d becomes small when a form is newly registered in the cache memory 1-6d, if the form having the level "1" is registered, such a form is preferentially deleted to thereby secure a free area. Incidentally, in the case of the level "0", the corresponding form image is not deleted unless a deletion command is sent from the host computer. Thus, only the forms having the level "0" may be registered in the cache memory 1-6d. In such a case, no new form image may be registered therein. However, there are only two or three forms which have high frequencies of use thereof. Further, the storage capacity, which is twice that of such forms, is allocated to the cache memory 1-6d. Consequently, there is no actual damage.

11. Form raster generation instruction for designating form data to be bitmapped and stored in the cache memory 1-6d of RAM 1-6;
12. PDL data termination instruction for indicating the end of PDL data; and
13. Job termination instruction for defining the registration job.

FIG. 17 is a diagram showing a form overlay implementing print command which indicates print data format and is sent from the host computer to the printer that is the fourth embodiment of the present invention.

In the case illustrated in this figure, print data consists of: form data which is various environmental setting data for printing form overlay data at a processing resolution of 600 dpi; and post-entering data (such as character data to be used to synthesize print data to be printed with the form). More concretely, the print data includes:

A Job initiation instruction which indicates the initiation of a job of registering the print data;

A Processing-resolution designating instruction for setting the processing resolution at which subsequent PDL data and form data are processed;

A Processing-tone-level designating instruction for designating tone levels to be processed.

Incidentally, the setting of the memory configuration of the memory areas of RAM 1-6 is performed according to the designated resolution and the tone level information.

Further, the processing of the subsequent PDL data and the form data according to the designated resolution and the tone level information.

Figure 16:
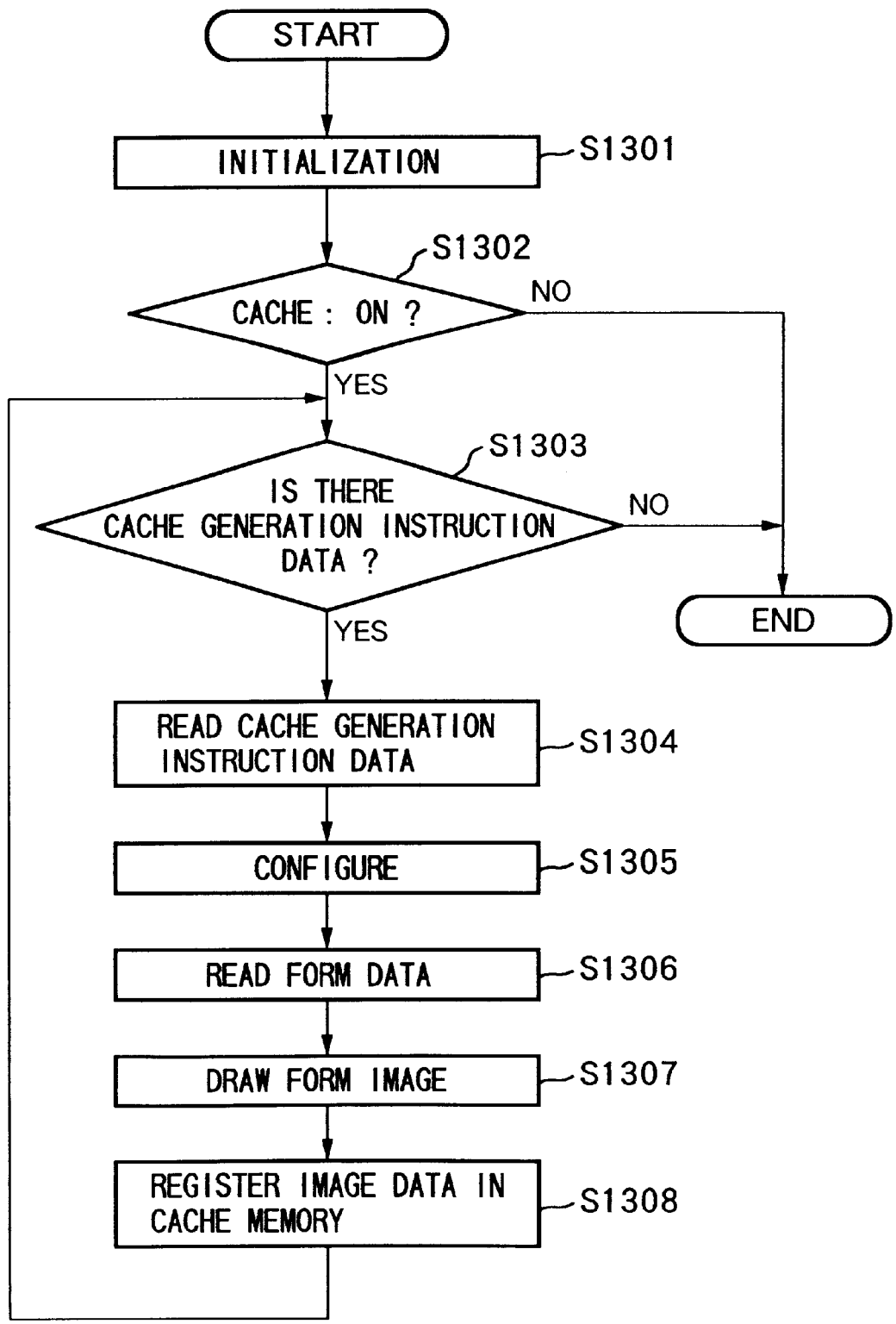
FIG. 16 is a flowchart illustrating a procedure for caching form (data) in the fourth embodiment of the present invention.

A Paper carrying direction setting instruction which designates a direction (a longitudinal feed direction/a lateral feed direction) in which the recording paper is carried;

A Binding width setting instruction and Binding direction setting instruction which designate an output image and the positions, at which the output image is mapped, when binding sheets of printing paper:

A PDL conversion instruction for instructing to activate PDL analyzing program so as to process the subsequent PDL, the generation of the form cache image of which is instructed;

A PDL data (generation) initiation instruction for indicating the beginning of the print data;

A Scale designation instruction for setting the scale when drawing an input image by performing expansion/reduction of the inputted post-entering data;

A Paper size designation instruction for designating the paper size of paper on which the post-entering data image is generated;

A Form overlay implementing instruction (including information specifying a form, such as a form name) for instructing to implement the form overlay;

This form overlay implementing instruction is used to the drawing of the form overlay data at a high speed by retrieving the form cache image, which is preliminarily stored in the cache memory 1-6d according to the generation instruction data as illustrated in FIGS. 15A, 15B and 16, by utilizing the form cache retrieval processing described with reference to FIG. 6, in such a manner as to be able utilize the form cache image. Incidentally, if the generation instruction data is not present as illustrated in FIG. 15, namely, if there is no form cache image, the form overlay processing is performed by reading and analyzing the form data, similarly as in the case of the post-entering data.

A Post-entering data which are used together with form data so as to achieve the printing of the form overlay image; and A PDL data termination instruction for indicating the end of PDL data; and Job termination instruction for defining the registration job.

As above described, in the case of the fourth embodiment of the present invention, a form image is generated according to the environmental conditions (such as the recording resolution, the recording magnification, recording paper size, the direction in which the recording paper is conveyed), which are designated by the form cache generation instruction data, from the form data registered in the flash memory 1-3 and by registering the form image in the cache memory 1-6d. Thus, various needs can be served by using only one form data.

Incidentally, the time, at which the form image is registered in the cache memory 1-6d, is not limited to the time when turning on the power supply. The registering of the form image may be automatically performed during idling, namely, during waiting for reception of print data, with the intention of coping with the case that form data is newly registered in the flash memory or that form cache generation instruction data is newly received. In this case, the process illustrated in the flowchart of FIG. 16 is performed in the case that no print data is received after the expiration of a predetermined time since the starting time of an idling state.

Incidentally, the processes to be carried out in the aforementioned first to fourth embodiments are performed mainly by CPU 1-1. Further, the programs may be provided by being installed into an external memory card. Namely, needless to say, such processes can be achieved by supplying a storage medium, in which software or program codes for realizing the functions of each of the aforementioned embodiments is stored, to the system or apparatus and then reading and executing the program code by means of a computer (namely, CPU or MPU (microprocessing unit)) of the system or apparatus.

In this case, the program code itself, which is read from the storage medium, realizes the functions of the aforementioned embodiments. Thus, such a storage medium storing the program code is the subject matter of the present invention.

For example, a floppy-disk, a hard disk, an optical (memory) disk, a magneto-optical disk, CD-ROM, CD-R, magnetic tape, a nonvolatile memory card and ROM may be used as the storage medium supplying or storing the program code.

Further, needless to say, the functions of the aforementioned embodiments may be achieved by the execution of not only the read program code but an operating system (OS), which performs a part or the entire of the actual necessary processing according to the instruction and designation generated by the program code, by means of the computer. Such a case is within the scope of the present invention.

Moreover, needless to say, the functions of the aforementioned embodiments may be achieved as a result of performing a part or the entirety of the actual necessary processing by means of CPU or the like, which is provided in a feature expansion board inserted into a computer or provided in a feature expansion unit connected to the computer, according to the instructions and designations issued by the program codes, which are read from the storage medium, after writing the program codes to the memory provided in the expansion board or unit. This case is within the scope of the present invention.

Additionally, in the foregoing description of the embodiments, the laser printers have been described by way of example. The present invention is, however, not limited thereto, but can be applied to a printer of any other type. Incidentally, it is preferable that the present invention is applied to a printer whose print speed is high to a certain extent. Namely, it is, therefore, desired that the present invention is applied to page printers, typically, laser beam printers and LED printers.

Further, in the aforementioned embodiments, there have been described the printer control unit 1001 and the actually printing portion are formed in such a manner as to be integral with each other as a single unit in a single casing. However, the printer control unit 1001 may be formed in such a way as to be separated from the actually printing portion.

As above described, in accordance with the embodiments of the present invention, the processing time needed for printing form overlay printing data can be reduced by storing the form images, which is generated before the post-entering print data is generated or stored, in the cache memory.

Moreover, in accordance with the embodiments of the present invention, the cache memory can be adaptably utilized by storing in the cache memory the form images, which are generated and coded after generated in bands, namely, correspondingly to each band. Thus, the embodiments of the present invention have an advantage in that the increase in memory capacity of the cache memory can be prevented.

Furthermore, in accordance with the embodiments of the present invention, the cache memory is not allocated to the bands in which no output images of form data to be printed are stored. Thus, the embodiments of the present invention have an advantage in that the efficiency in using the cache memory can be enhanced.

Besides, form image data generated adaptably corresponding to the generation conditions (such as the resolution, the scaling and the angle of rotation of the image of one page) for the post-entering print data at the time of printing thereof can be stored in the cache memory. Thus, the embodiments of the present invention have an advantage in that the processing time at the time of printing form overlay printing data can be reduced.

Additionally, as a result of storing the form image data, which is generated adaptably corresponding to the generation conditions (such as the resolution, the scaling and the angle of rotation of the image of one page) for the post-entering print data at the time of printing thereof, the embodiments of the present invention have an advantage in that the necessary storage capacity of the registration memory can be decreased.

As above described, in accordance with the present invention, a form is registered in the cache memory according to the form caching instruction data. Thus, form data, which is a user resource, can be reused without being changed. Consequently, user's convenience can be enhanced and the form overlay processing can be achieved at a high speed.

Although preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. An output control device for receiving form data as code data and print data as code data from an external device, the output control device comprising:
    a first memory adapted to store inputted form data;
    a generating unit adapted to generate image data on a band memory according to the code data in a band unit;
    a second memory adapted to store form image data of the plural bands generated at a predetermined time according to the form data by the generating unit; and
    a control unit adapted to control the generating unit to generate image data on the band memory according to the print data and overlaying form image data of the band with the generated image data of the print data when said form image data corresponding to form data designated by inputted data is stored in said second memory, and for controlling said generating unit to generate form image data on the band memory according to form data, stored in said first memory, designated by inputted data, and to generate image data on the band memory according to the print data, when form image data corresponding to said form data designated by said inputted data is not stored in said second memory.

2. The output control device according to claim 1, wherein said predetermined time is a time at which a power supply is turned on.

3. The output control device according to claim 1, wherein said predetermined time is a time at which idling is performed.

4. The output control device according to claim 1, wherein said first memory is nonvolatile memory.

5. The output control device according to claim 1, which further comprises a print device adapted to perform a print operation according to image data generated by said generation unit.

6. The output control device according to claim 1, wherein said generating unit generates form image data according to resolution and/or the number of tone levels designated by a form generating instruction data and caches the generated form image data in said second memory.

7. The output control device according to claim 6, which further comprises a configuration unit adapted to configure a memory, which serves as a work area, according to the designated resolution and/or the designated number of tone levels when caching form image data in said second memory.

8. The output control device according to claim 1, which further comprises a deletion unit adapted to delete image data of a second level from the stored image data without deleting image data of a first level therefrom, in case that there is no free space in said second memory when caching form image data to the second memory,
wherein the image data of the first level is deleted according to a deletion command inputted from an external device.

9. An output control method for receiving form data as code data and print data as code data from an external device, comprising:
a first storage step of storing inputted form data;
a generation step of generating image data on a band memory according to the code data in a band unit;
a second storage step of storing form image data of the plural bands generated at a predetermined time according to the form data by the generating unit; and
a control step to control the generating unit to generate image data on the band memory according to the print data and overlaying form image data of the band with the generated image data of the print data when said form image data corresponding to form data designated by inputted data is stored in said second memory, and for controlling said generating unit to generate form image data on the band memory according to form data, stored in said first memory, designated by inputted data, and to generate image data on the band memory according to the print data, when form image data corresponding to said form data designated by said inputted data is not stored in said second memory.

10. The output control method according to claim 9, wherein said predetermined time is a time at which a power supply is turned on.

11. The output control method according to claim 9, wherein said predetermined time is a time at which idling is performed.

12. The output control method according to claim 9, wherein said memory is nonvolatile.

13. The output control method according to claim 9, which further comprises a print step of performing a print operation according to image data generated in said generation step.

14. The output control method according to claim 9, wherein said form generation instruction data includes data representing a resolution and/or data representing the number of tone levels, and wherein, in said second storage step, form image data is generated according to designated resolution and/or the designated number of tone levels and caches the generated form image data in said memory.

15. The output control method according to claim 14, which further comprises a configuration step of configuring a memory, which serves as a work area, according to the designated resolution and/or the designated number of tone levels when caching form image data in said memory in said second storage step.

16. The output control method according to claim 9, which further comprises a deletion step of deleting image data of a second level from the cached image data without deleting image data of a first level therefrom, in case that there is no free space in said second memory when storing form image data in said second storage step,
wherein the image data of the first level is deleted according to a deletion command inputted from an external device.

17. A storage medium for storing program codes, that cause a computer, which reads and executes said program codes, to act as a device for receiving form data as code data and print data as code data from an external device, and outputting image data based on inputted data, said storage medium including:
a program code for a first storage step of storing inputted form data;
a program code for generating image data on a band memory according to the code data in a band unit;
a program code for a second storage step of storing form image data of the plural bands generated at a predetermined time according to the form data by the generating unit; and
a program code for controlling the generating program code to generate image data on the band memory according to the print data and overlaying form image data of the band with the generated image data of the print data when said form image data corresponding to form data designated by inputted data is stored in said second memory, and for controlling said generating unit to generate form image data on the band memory according to form data, stored in said first memory, designated by inputted data, and to generate image data on the band memory according to the print data, when form image data corresponding to said form data designated by said inputted data is not stored in said second memory.

18. The storage medium according to claim 17, wherein said predetermined time is a time at which a power supply is turned on.

19. The storage medium according to claim 17, wherein said predetermined time is a time at which idling is performed.

20. The storage medium according to claim 17, wherein said memory is nonvolatile.

21. The storage medium according to claim 17, which further includes a program code for a print step of performing a print operation according to image data generated in said controlling step.

22. The storage medium according to claim 17, wherein said form generation instruction data includes data representing a resolution and/or data representing the number of tone levels, and wherein, in said second memory step, form image data is generated according to designated resolution and/or the designated number of tone levels and stores the generated form image data in said second memory.

23. The storage medium according to claim 22, which further includes a program code for a configuration step of configuring a memory, which serves as a work area, according to the designated resolution and/or the designated number of tone levels when storing form image data in said second memory in said second storage step.

24. The storage medium according to claim 17, which further includes a program code for a deletion step of deleting image data of a second level from the stored image data without deleting image data of a first level therefrom, in case that there is no free space in said second memory when storing form image data in said second storing step, wherein the image data of the first level is deleted according to a deletion command inputted from an external device.

25. An image processing apparatus for receiving print data and cache generation instruction data, for generating image data based on said print data and for outputting the generated image data to a predetermined image forming apparatus, said image processing apparatus comprising:

a memory adapted to store at least one form data;

an output, device adapted to read, in a band unit, image data corresponding to form data designated by form using instruction data from a predetermined cache memory when said form using instruction data is present in said print data, for synthesizing, in the band unit, output data from the read image data and image data generated according to the print data and for outputting the output data to said image forming apparatus; and cache memory adapted to read form data, which is designated by said cache generation instruction data and is stored in said memory, for generating corresponding form image data and for registering each of generated band image corresponding to the form image data in said cache memory.

26. The image processing apparatus according to claim 25, wherein, when registering image data representing a form in said cache memory, a compressive coding is performed on the image data, and wherein, when reading image data representing a form, the read image data is decoded.

27. The image processing apparatus according to claim 25, wherein form image data is registered correspondingly to each band in said cache memory.

28. The image processing apparatus according to claim 25, wherein the form data stored in said memory is data written in a program description language which is independent of resolution.

29. The image processing apparatus according to claim 26, wherein said cache memory reads said corresponding form data and generates intermediate data so as to facilitate image expansion in accordance with a designated format and further generates image data according to said intermediate data and then registers the generated image data in said cache memory.

30. The image processing apparatus according to claim 26, wherein said output device is operative to output image data correspondingly to each band having a predetermined size, and wherein form image data, which is coded and compressed correspondingly to each band is registered in said cache memory.

31. The image processing apparatus according to claim 30, wherein, when there is no form data corresponding to a band, a blank image is generated correspondingly thereto.

32. The image processing apparatus according to claim 26, wherein form data is cached correspondingly to a color component.

33. The image processing apparatus according to claim 26, wherein said memory stores information representing a frequency of use of each form data, and wherein, when turning on a power supply, data obtained by coding and compressing image data, which corresponds to form data having a high frequency of use, is registered in said cache memory.

34. The image processing apparatus according to claim 25, which further includes a resetting unit adapted to reset a configuration of said apparatus according to a generation condition designated by generation designating data, and wherein said cache generation instruction data includes said generation condition designating data for generating image data which corresponds to form data.

35. The image processing apparatus according to claim 25, which further includes a cache generation instruction data storage area for storing said cache generation instruction data, wherein said cache memory reads cache generation instruction data from said cache generation instruction data storage area and then reads form data designated by the read cache generation instruction data and generates form image data.

36. An image processing method for receiving print data and cache generation instruction data, for generating image data based on said print data and for outputting the generated image data to a predetermined image forming apparatus, said image processing method comprising:

a storage step of storing at least one form data;

an output step of reading, in a band unit, image data corresponding to form data designated by form using instruction data from a predetermined cache memory when said form using instruction data is present in said print data, and of synthesizing, in the band unit, output data from the read image data and image data generated according to the print data and of outputting the output data to said image forming apparatus; and a cache step of reading form data, which is designated by said cache generation instruction data and is stored in said memory, and of generating corresponding form image data in the band unit and of registering each of generated band image data corresponding to the form image data in said cache memory.

37. The image processing method according to claim 36, wherein, when registering image data representing a form in said cache memory, a compressive coding is performed on the image data, and wherein, when reading image date representing a form, the read image data is decoded.

38. The image processing method according to claim 36, wherein form image data is registered correspondingly to each band in said cache memory.

39. The image processing method according to claim 36, wherein the form data stored in said memory is data written in a program description language which is independent of resolution.

40. The image processing method according to claim 36, wherein said cache memory reads said corresponding form data and generates intermediate data so as to facilitate image expansion in accordance with a designated format and further generates image data according to said intermediate data and then registers the generated image data in said cache memory.

41. The image processing method according to claim 36, wherein said output device is operative to output image data correspondingly to each band having a predetermined size, and wherein form image data, which is coded and compressed correspondingly to each band is registered in said cache memory.

42. The image processing method according to claim 41, wherein, when there is no form data corresponding to a band, a blank image is generated correspondingly thereto.

43. The image processing method according to claim 36, wherein form data is cached correspondingly to a color component.

44. The image processing method according to claim 36, wherein said memory stores information representing a frequency of use of each form data, and wherein, when turning on a power supply, data obtained by coding and compressing image data, which corresponds to form data having a high frequency of use, is registered in said cache memory.

* * * * *

UNITED STATES PATENT AND TRADEMARK OFFICE
CERTIFICATE OF CORRECTION

PATENT NO.    : 6,304,336 B1
DATED         : October 16, 2001
INVENTOR(S)   : Akio Sugaya It is certified that error appears in the above-identified patent and that said Letters Patent is hereby corrected as shown below:

Column 5,
Line 22, "staten" should read -- state --.

Column 6,
Line 35, "One more" should read -- One or more --.

Column 18,
Line 22, "to" should read -- to be --;
Line 58, "paper:" should read -- paper; --; and
Line 62, "instructed;" should read -- instructed. --.

Column 20,
Line 32, "able" should read -- able to --.

Column 26,
Line 29, "date" should read -- data --.

Signed and Sealed this

Sixth Day of May, 2003

JAMES E. ROGAN
*Director of the United States Patent and Trademark Office*

UNITED STATES PATENT AND TRADEMARK OFFICE
CERTIFICATE OF CORRECTION

| | |
|---|---|
| PATENT NO. | : 6,304,336 B1 |
| APPLICATION NO. | : 09/030375 |
| DATED | : October 16, 2001 |
| INVENTOR(S) | : Akio Sugaya |

It is certified that error appears in the above-identified patent and that said Letters Patent is hereby corrected as shown below:

In the Claims

COLUMN 22, LINE 37 THROUGH COLUMN 26, LINE 64, CLAIMS 1-44 SHOULD BE DELETED AND SUBSTITUTED WITH THE FOLLOWING CLAIMS 1-44:

--1. An output control device for receiving form data as code data and print data as code data from an external device, the output control device comprising:

a first memory adapted to store inputted form data;

a generating unit adapted to generate image data on a band memory according to the code data in a band unit by executing a rasterizing process;

a second memory adapted to store form image data of the plural bands generated at a predetermined time according to the form data by the generating unit, the second memory being different from the band memory; and a control unit adapted to control the generating unit, in case said form image data corresponding to form data designated by inputted data is stored in said second memory, to generate image data on the band memory according to the print data so as to overlay form image data of the band, which is transmitted from said second memory to said band memory without the rasterizing process, with the generated image data of the print data, and, in case said form image data corresponding to said form data designated by said inputted data is not stored in said second memory, to control said generating unit to generate form image data on the band memory according to form data, stored in said first memory, designated by inputted data by executing the rasterizing process, and then to generate image data on the band memory according to the print data.

2. The output control device according to claim 1, wherein said predetermined time is a time at which a power supply is turned on.

Signed and Sealed this
First Day of April, 2014

Michelle K. Lee
*Deputy Director of the United States Patent and Trademark Office*

3. The output control device according to claim 1, wherein said predetermined time is a time at which idling is performed.

4. The output control device according to claim 1, wherein said first memory is nonvolatile memory.

5. The output control device according to claim 1, which further comprises a print device adapted to perform a print operation according to image data generated by said generation unit.

6. The output control device according to claim 1, wherein said generating unit generates form image data according to resolution and/or the number of tone levels designated by a form generating instruction data and caches the generated form image data in said second memory.

7. The output control device according to claim 6, which further comprises a configuration unit adapted to configure a memory, which serves as a work area, according to the designated resolution and/or the designated number of tone levels when caching form image data in said second memory.

8. The output control device according to claim 1, which further comprises a deletion unit adapted to delete image data of a second level from the stored image data without deleting image data of a first level therefrom, in case that there is no free space in said second memory when caching form image data to the second memory, wherein the image data of the first level is deleted according to a deletion command inputted from an external device.

9. An output control method for receiving form data as code data and print data as code data from an external device, comprising:

a first storage step of storing inputted form data;

a generation step of generating image data on a band memory according to the code data in a band unit by executing a rasterizing process;

a second storage step of storing form image data of the plural bands generated at a predetermined time according to the form data by the generating unit, the second storage step not storing form image data in the band memory; and a control step to control the generating unit, in case said form image data corresponding to form data designated by inputted data is stored in said second storage step, to generate image data on the band memory according to the print data so as to overlay form image data of the band, which is transmitted in said second storage step to said band memory without the rasterizing process, with the generated image data of the print data, and, in case said form image data corresponding to said form data designated by said inputted data is not stored in said second storage step, to control said generating unit to generate form image data on the band memory according to form data, stored in said first memory, designated by inputted data by executing the rasterizing process, and then to generate image data on the band memory according to the print data.

10. The output control method according to claim 9, wherein said predetermined time is a time at which a power supply is turned on.

11. The output control method according to claim 9, wherein said predetermined time is a time at which idling is performed.

12. The output control method according to claim 9, wherein said memory is nonvolatile.

13. The output control method according to claim 9, which further comprises a print step of performing a print operation according to image data generated in said generation step.

14. The output control method according to claim 9, wherein said form generation instruction data includes data representing a resolution and/or data representing the number of tone levels, and wherein, in said second storage step, form image data is generated according to designated resolution and/or the designated number of tone levels and caches the generated form image data in said memory.

15. The output control method according to claim 14, which further comprises a configuration step of configuring a memory, which serves as a work area, according to the designated resolution and/or the designated number of tone levels when caching form image data in said memory in said second storage step.

16. The output control method according to claim 9, which further comprises a deletion step of deleting image data of a second level from the cached image data without deleting image data of a first level therefrom, in case that there is no free space in said second memory when storing form image data in said second storage step, wherein the image data of the first level is deleted according to a deletion command inputted from an external device.

17. A storage medium for storing program codes, that cause a computer, which reads and executes said program codes, to act as a device for receiving form data as code data and print data as code data from an external device, and outputting image data based on inputted data, said storage medium including:

a program code for a first storage step of storing inputted form data;

a program code for generating image data on a band memory according to the code data in a band unit by executing a rasterizing process;

a program code for a second storage step of storing form image data of the plural bands generated at a predetermined time according to the form data by the generating unit, the second storage step not storing form image data in the band memory; and a program code for controlling the generating program code, in case said form image data corresponding to form data designated by inputted data is stored in said second storage step, to generate image data on the band memory according to the print data so as to overlay form image data of the band, which is transmitted in said second storage step to said band memory without the rasterizing process, with the generated image data of the print data, and, in case said form image data corresponding to said form data designated by said inputted data is not stored in said second storage step, to control said generating unit to generate form image data on the band memory according to form data, stored in said first memory, designated by inputted data by executing the rasterizing process, and then to generate image data on the band memory according to the print data.

18.  The storage medium according to claim 17, wherein said predetermined time is a time at which a power supply is turned on.

19.  The storage medium according to claim 17, wherein said predetermined time is a time at which idling is performed.

20.  The storage medium according to claim 17, wherein said memory is nonvolatile.

21.  The storage medium according to claim 17, which further includes a program code for a print step of performing a print operation according to image data generated in said controlling step.

22.  The storage medium according to claim 17, wherein said form generation instruction data includes data representing a resolution and/or data representing the number of tone levels, and wherein, in said second memory step, form image data is generated according to designated resolution and/or the designated number of tone levels and stores the generated form image data in said second memory.

23.  The storage medium according to claim 22, which further includes a program code for a configuration step of configuring a memory, which serves as a work area, according to the designated resolution and/or the designated number of tone levels when storing form image data in said second memory in said second storage step.

24.  The storage medium according to claim 17, which further includes a program code for a deletion step of deleting image data of a second level from the stored image data without deleting image data of a first level therefrom, in case that there is no free space in said second memory when storing form image data in said second storing step, wherein the image data of the first level is deleted according to a deletion command inputted from an external device.

25.  An image processing apparatus for receiving print data and cache generation instruction data, for generating image data based on said print data and for outputting the generated image data to a predetermined image forming apparatus, said image processing apparatus comprising:

a memory adapted to store at least one form data;

an output device adapted to read, in a band unit, image data corresponding to form data designated by form using instruction data from a predetermined cache memory when said form using instruction data is present in said print data, for synthesizing, in the band unit, output data from the read image data and image data generated according to the print data and for outputting the output data to said image forming apparatus; and cache memory adapted to read form data, which is designated by said cache generation instruction data and is stored in said memory, for generating corresponding form image data and for registering each of generated band image corresponding to the form image data in said cache memory.

26. The image processing apparatus according to claim 25, wherein, when registering image data representing a form in said cache memory, a compressive coding is performed on the image data, and wherein, when reading image data representing a form, the read image data is decoded.

27. The image processing apparatus according to claim 25, wherein form image data is registered correspondingly to each band in said cache memory.

28. The image processing apparatus according to claim 25, wherein the form data stored in said memory is data written in a program description language which is independent of resolution.

29. The image processing apparatus according to claim 26, wherein said cache memory reads said corresponding form data and generates intermediate data so as to facilitate image expansion in accordance with a designated format and further generates image data according to said intermediate data and then registers the generated image data in said cache memory.

30. The image processing apparatus according to claim 26, wherein said output device is operative to output image data correspondingly to each band having a predetermined size, and wherein form image data, which is coded and compressed correspondingly to each band is registered in said cache memory.

31. The image processing apparatus according to claim 30, wherein, when there is no form data corresponding to a band, a blank image is generated correspondingly thereto.

32. The image processing apparatus according to claim 26, wherein form data is cached correspondingly to a color component.

33. The image processing apparatus according to claim 26, wherein said memory stores information representing a frequency of use of each form data, and wherein, when turning on a power supply, data obtained by coding and compressing image data, which corresponds to form data having a high frequency of use, is registered in said cache memory.

34. The image processing apparatus according to claim 25, which further includes a resetting unit adapted to reset a configuration of said apparatus according to a generation condition designated by generation designating data, and wherein said cache generation instruction data includes said generation condition designating data for generating image data which corresponds to form data.

35. The image processing apparatus according to claim 25, which further includes a cache generation instruction data storage area for storing said cache generation instruction data, wherein said cache memory reads cache generation instruction data from said cache generation instruction data storage area and then reads form data designated by the read cache generation instruction data and generates form image data.

36. An image processing method for receiving print data and cache generation instruction data, for generating image data based on said print data and for outputting the generated image data to a predetermined image forming apparatus, said image processing method comprising:

a storage step of storing at least one form data;

an output step of reading, in a band unit, image data corresponding to form data designated by form using instruction data from a predetermined cache memory when said form using instruction data is present in said print data, and of synthesizing, in the band unit, output data from the read image data and image data generated according to the print data and of outputting the output data to said image forming apparatus; and a cache step of reading form data, which is designated by said cache generation instruction data and is stored in said memory, and of generating corresponding form image data in the band unit and of registering each of generated band image data corresponding to the form image data in said cache memory.

37. The image processing method according to claim 36, wherein, when registering image data representing a form in said cache memory, a compressive coding is performed on the image data, and wherein, when reading image data representing a form, the read image data is decoded.

38. The image processing method according to claim 36, wherein form image data is registered correspondingly to each band in said cache memory.

39. The image processing method according to claim 36, wherein the form data stored in said memory is data written in a program description language which is independent of resolution.

40. The image processing method according to claim 36, wherein said cache memory reads said corresponding form data and generates intermediate data so as to facilitate image expansion in accordance with a designated format and further generates image data according to said intermediate data and then registers the generated image data in said cache memory.

41. The image processing method according to claim 36, wherein said output device is operative to output image data correspondingly to each band having a predetermined size, and wherein form image data, which is coded and compressed correspondingly to each band is registered in said cache memory.

42. The image processing method according to claim 41, wherein, when there is no form data corresponding to a band, a blank image is generated correspondingly thereto.

43. The image processing method according to claim 36, wherein form data is cached correspondingly to a color component.

44. The image processing method according to claim 36, wherein said memory stores information representing a frequency of use of each form data, and wherein, when turning on a power supply, data obtained by coding and compressing image data, which corresponds to form data having a high frequency of use, is registered in said cache memory.--